(12) United States Patent
Bao

(10) Patent No.: US 12,513,364 B2
(45) Date of Patent: Dec. 30, 2025

(54) APPLICATION PERMISSION SYNCHRONIZATION METHOD AND RELATED DEVICE

(71) Applicant: HUAWEI TECHNOLOGIES CO., LTD., Guangdong (CN)

(72) Inventor: Kunchao Bao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 18/746,847

(22) Filed: Jun. 18, 2024

(65) Prior Publication Data
US 2024/0340494 A1 Oct. 10, 2024

Related U.S. Application Data

(63) Continuation of application No. PCT/CN2022/138512, filed on Dec. 13, 2022.

(30) Foreign Application Priority Data

Dec. 24, 2021 (CN) .......................... 202111597782.8

(51) Int. Cl.
*H04N 21/45* (2011.01)
*H04N 21/485* (2011.01)

(52) U.S. Cl.
CPC ....... *H04N 21/4532* (2013.01); *H04N 21/485* (2013.01)

(58) Field of Classification Search
CPC .............. H04N 21/4532; H04N 21/485; G06F 2221/2141; G06F 21/629; G06F 8/71; G06F 21/121
See application file for complete search history.

(56) References Cited

U.S. PATENT DOCUMENTS

| 6,112,263 A  * | 8/2000 | Futral ....................... G06F 9/52 710/37 |
| 10,289,839 B1 * | 5/2019 | Bedekar .............. G06F 3/04883 |
| 11,061,667 B1 * | 7/2021 | Gujarathi ................ H04L 67/10 |

(Continued)

FOREIGN PATENT DOCUMENTS

WO 2021190179 A1 9/2021
WO 2021253975 A1 12/2021

*Primary Examiner* — Timothy R Newlin
(74) *Attorney, Agent, or Firm* — WOMBLE BOND DICKINSON (US) LLP

(57) ABSTRACT

This application provides an application permission synchronization method and a related device. The method is applied to a first electronic device, and the method includes: in response to a first user operation, changing permission granting information of a first application on the first electronic device, where the permission granting information is used to describe a permission granted to the first application to invoke at least one of a software function or a hardware function of the first electronic device; and if a security level of the first electronic device is higher than a security level of a second electronic device, synchronizing the change of the permission granting information of the first application on the first electronic device to the second electronic device based on permission synchronization configuration information of the first application on the first electronic device and the second electronic device.

20 Claims, 15 Drawing Sheets

(56) References Cited

U.S. PATENT DOCUMENTS

| | | | |
|---|---|---|---|
| 2007/0038632 A1* | 2/2007 | Engstrom | G06F 21/62 |
| | | | 707/999.009 |
| 2009/0165129 A1* | 6/2009 | Wilhelm | G06F 21/629 |
| | | | 726/21 |
| 2013/0091542 A1* | 4/2013 | Cohen | G06F 21/10 |
| | | | 726/1 |
| 2013/0139251 A1* | 5/2013 | Amemura | G06F 12/1416 |
| | | | 726/20 |
| 2013/0160110 A1* | 6/2013 | Schechter | G06F 21/629 |
| | | | 726/19 |
| 2014/0122714 A1* | 5/2014 | Jung | H04L 41/5054 |
| | | | 709/225 |
| 2014/0143886 A1* | 5/2014 | Eversoll | G06F 21/60 |
| | | | 726/27 |
| 2015/0169154 A1* | 6/2015 | Ainslie | G06F 21/62 |
| | | | 715/777 |
| 2016/0205139 A1* | 7/2016 | Davies | H04L 63/0227 |
| | | | 726/1 |
| 2016/0232336 A1* | 8/2016 | Pitschel | G06F 21/305 |
| 2016/0344736 A1* | 11/2016 | Khait | H04L 63/102 |
| 2017/0364242 A1* | 12/2017 | Bhageria | H04M 1/72445 |
| 2018/0152460 A1* | 5/2018 | Lin | G06F 16/9566 |
| 2018/0288616 A1* | 10/2018 | Knox | H04W 12/08 |
| 2019/0311150 A1* | 10/2019 | Tamayo-Rios | H04L 63/0428 |
| 2021/0312075 A1* | 10/2021 | Alameh | H04L 63/107 |
| 2021/0390212 A1* | 12/2021 | Si | G06F 21/6281 |
| 2024/0193306 A1* | 6/2024 | Pu | G06F 21/629 |

\* cited by examiner

APPLICATION PERMISSION SYNCHRONIZATION METHOD AND RELATED DEVICE

CROSS-REFERENCE TO RELATED APPLICATIONS

This application is a continuation of International Application No. PCT/CN2022/138512, filed on Dec. 13, 2022, which claims priority to Chinese Patent Application No. 202111597782.8, filed on Dec. 24, 2021. The disclosures of the aforementioned applications are hereby incorporated by reference in their entireties.

TECHNICAL FIELD

This application relates to the field of terminal technologies, and in particular, to an application permission synchronization method and a related device.

BACKGROUND

A user may connect a plurality of terminal devices (for example, a mobile phone, a smart television, a tablet computer, and a smart watch) to implement resource sharing and collaborative operations. However, a larger quantity of connected devices indicates higher costs of permission synchronization for a same application (for example, a chat application) on different devices. For example, if permission synchronization for an application needs to be implemented on different devices, after a permission for the application is set on one device, a same operation needs to be performed on each of the other devices.

SUMMARY

Embodiments of this application disclose an application permission synchronization method and a related device, to conveniently synchronize an application permission between different devices, so that efficiency of application permission synchronization is improved.

A first aspect of this application discloses an application permission synchronization method, and the method includes: in response to a first user operation, changing permission granting information of a first application on a first electronic device, where the permission granting information is used to describe a permission granted to an application to invoke software and hardware functions of an electronic device; and if a security level of the first electronic device is higher than a security level of a second electronic device, synchronizing the change of the permission granting information of the first application on the first electronic device to the second electronic device based on permission synchronization configuration information of the first application on the first electronic device and the second electronic device, where the permission synchronization configuration information is used to describe whether a permission synchronization function of an application is enabled.

According to the application permission synchronization method provided in this embodiment of this application, after a user modifies a permission for an application on the first electronic device, the permission change is automatically synchronized to the second electronic device, and the user does not need to perform a change operation on the second electronic device, so that efficiency of application permission synchronization is improved.

In one embodiment, the method further includes: in response to a second user operation, changing permission synchronization configuration information of the first electronic device; and sending changed permission synchronization configuration information of the first electronic device to the second electronic device.

According to the application permission synchronization method, after the permission synchronization function of the application on the first electronic device is enabled or disabled, related processing may be performed to implement application permission synchronization, so that efficiency of application permission synchronization is improved.

In one embodiment, after the sending changed permission synchronization configuration information of the first electronic device to the second electronic device, the method further includes: receiving permission granting information of the first application on the second electronic device, where the second electronic device sends the permission granting information of the first application on the second electronic device to the first electronic device after determining that a permission synchronization function of the first application is already enabled on the first electronic device and the second electronic device; and if the security level of the second electronic device is higher than the security level of the first electronic device, synchronizing the permission granting information of the first application on the first electronic device based on the permission granting information of the first application on the second electronic device.

In one embodiment, the method further includes: receiving permission synchronization configuration information of the second electronic device; and locally storing the permission synchronization configuration information of the second electronic device.

In one embodiment, the method further includes: when a second application is being installed on the first electronic device, setting permission synchronization configuration information of the first electronic device; if the security level of the second electronic device is higher than the security level of the first electronic device, and an application permission synchronization function is already enabled on the first electronic device and the second electronic device, sending a permission synchronization request to the second application to the second electronic device; receiving permission granting information that is of the second application on the second electronic device and that is returned by the second electronic device; and setting permission granting information of the second application on the first electronic device based on the permission granting information of the second application on the second electronic device.

According to the application permission synchronization method, when the second application is being installed on the first electronic device, if a permission synchronization function of the second application is enabled, and the permission synchronization function of the second application is already enabled on the second electronic device, the permission granting information of the second application on the second electronic device is obtained, and a permission for the second application on the first electronic device is set based on the permission granting information of the second application on the second electronic device. The user does not need to perform an authorization operation on the second application, so that efficiency of configuring an application permission during application installation is improved.

In one embodiment, the setting permission synchronization configuration information of the first electronic device includes: if a permission synchronization function of the second application is already enabled on the second electronic device, prompting a user to confirm whether to enable the permission synchronization function of the second application on the first electronic device; and setting the permission synchronization configuration information of the first electronic device based on confirmation of the user.

In one embodiment, the method further includes: deleting locally stored permission synchronization configuration information of the second electronic device when it is detected that the second electronic device disconnects a communication connection from the first electronic device.

In one embodiment, the method further includes: sending a request for querying permission synchronization configuration information to a third electronic device when it is detected that the third electronic device establishes a communication connection to the first electronic device; and receiving permission synchronization configuration information that is of the third electronic device and that is returned by the third electronic device in response to the request for querying permission synchronization configuration information.

In one embodiment, the method further includes: if the security level of the first electronic device is higher than a security level of the third electronic device, synchronizing permission granting information of an application on the first electronic device to the third electronic device based on permission synchronization configuration information of the first electronic device and the third electronic device.

In one embodiment, the method further includes: if a preset user operation is received, displaying an application permission setting interface, where the application permission setting interface includes a permission synchronization option or a permission synchronization switch.

A second aspect of this application discloses a computer-readable storage medium that includes computer instructions. When the computer instructions are run on an electronic device, the electronic device is enabled to perform the application permission synchronization method according to the first aspect.

A third aspect of this application discloses an electronic device. The electronic device includes a processor and a memory, the memory is configured to store instructions, and the processor is configured to invoke the instructions in the memory, to enable the electronic device to perform the application permission synchronization method according to the first aspect.

A fourth aspect of this application discloses a chip system. The chip system is used in an electronic device. The chip system includes an interface circuit and a processor. The interface circuit and the processor are interconnected by using a line. The interface circuit is configured to: receive a signal from a memory of the electronic device, and send the signal to the processor, where the signal includes computer instructions stored in the memory. When the processor executes the computer instructions, the chip system performs the application permission synchronization method according to the first aspect.

A fifth aspect of this application discloses a computer program product. When the computer program product is run on a computer, the computer is enabled to perform the application permission synchronization method according to the first aspect.

A sixth aspect of this application discloses an apparatus. The apparatus has a function of implementing a behavior of an electronic device in the method according to the first aspect. The function may be implemented by using hardware, or may be implemented by using hardware executing corresponding software. The hardware or software includes one or more modules corresponding to the function.

It should be understood that the computer-readable storage medium according to the second aspect, the electronic device according to the third aspect, the chip system according to the fourth aspect, the computer program product according to the fifth aspect, and the apparatus according to the sixth aspect all correspond to the method in the first aspect. Therefore, for beneficial effects that can be achieved by the computer-readable storage medium, the electronic device, the chip system, the computer program product, and the apparatus, refer to beneficial effects in the corresponding methods provided above. Details are not described herein again.

DESCRIPTION OF EMBODIMENTS

For ease of understanding, descriptions of some concepts related to embodiments of this application are provided as examples for reference.

It should be noted that "at least one" means one or a plurality of and "a plurality of" means two or more in this application. The term "and/or" describes an association relationship between associated objects and represents that three relationships may exist. For example, A and/or B may represent the following cases: Only A exists, both A and B exist, and only B exists, where A and B may be singular or plural. In this specification, claims, and accompanying drawings of this application, terms "first", "second", "third", "fourth", and the like (if existent) are intended to distinguish between similar objects but do not necessarily indicate an order or sequence.

To better understand an application permission synchronization method and a related device that are provided in embodiments of this application, the following first describes an application scenario of the application permission synchronization method according to this application.

Figure 1:
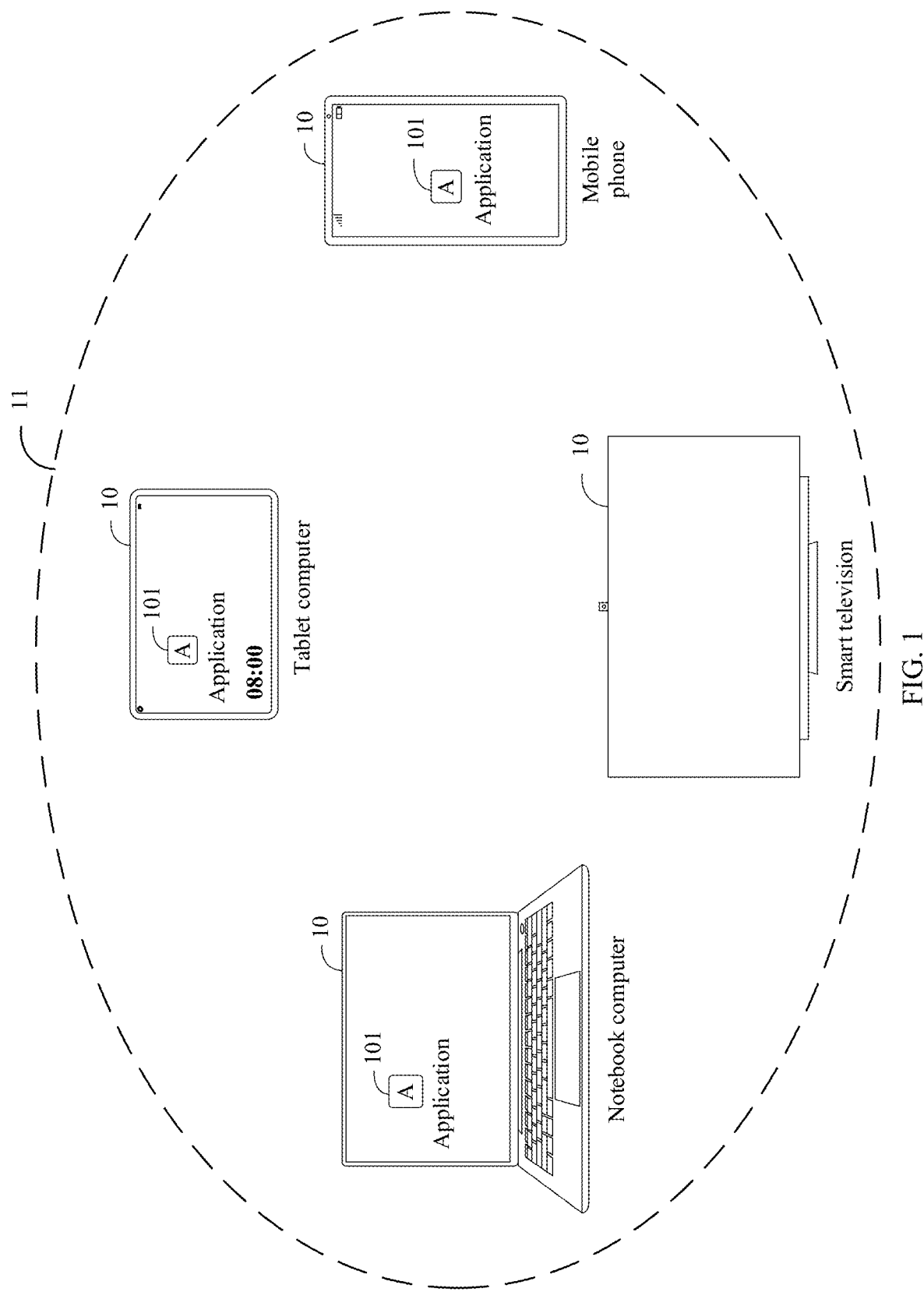
FIG. 1 is a schematic diagram of an application scenario of an application permission synchronization method according to an embodiment of this application.

FIG. 1 is a schematic diagram of an application scenario of an application permission synchronization method according to an embodiment of this application.

As shown in FIG. 1, a network 11 includes a plurality of electronic devices 10. At least two electronic devices 10 include a same application 101 (for example, a chat application). The electronic device 10 may be a mobile phone, a tablet computer, a notebook computer, an in-vehicle computer, a smart watch, a smart television, or the like. For example, refer to FIG. 1. The electronic devices 10 include a mobile phone, a tablet computer, a notebook computer, and a smart television. The mobile phone, the tablet computer, and the notebook computer include the same application 101. According to the application permission synchronization method provided in embodiments of this application, a permission for the same application 101 (for example, the application 101 on the mobile phone, the tablet computer, and the notebook computer in FIG. 1) can be conveniently synchronized between different electronic devices 10, so that efficiency of application permission synchronization is improved.

The plurality of electronic devices 10 may be devices of different types (for example, the mobile phone, the tablet computer, the notebook computer, and the smart television in FIG. 1), or may be devices of a same type (for example, all the electronic devices are mobile phones).

A permission for the application 101 is a permission granted by the electronic device 10 to the application 101 to invoke software and hardware functions of the electronic device 10. The permission for the application 101 may include Storage, Phone, Location, Camera, Microphone, Contacts, In-app installations, Dropzone, Create home screen shortcuts, and the like. The permission for the application 101 may include two states: allowed and denied. If a permission is in an allowed state, it indicates that the application 101 has the permission. If a permission is in a denied state, it indicates that the application 101 does not have the permission. For example, if a storage permission for the application 101 is in an allowed state, it indicates that the application 101 has a storage access permission. If a storage permission for the application 101 is in a denied state, it indicates that the application 101 does not have a storage access permission.

In embodiments of this application, a user may enable or disable a permission synchronization function of the application 101. If the permission synchronization function of the application 101 is already enabled on the electronic device 10, it indicates that the permission for the application 101 on the electronic device 10 is synchronized. If the permission synchronization function of the application 101 is already disabled on the electronic device 10, it indicates that the permission for the application 101 on the electronic device 10 is not synchronized. Enabling and disabling of the permission synchronization function of the application 101 is described in FIG. 6.

In this embodiment of this application, the network 11 may be established for the plurality of electronic devices 10, and application permission synchronization is performed between the electronic devices 10 in the network 11, so that application permission synchronization is performed between the plurality of electronic devices 10. For example, refer to FIG. 1. It is assumed that the mobile phone, the tablet computer, and the notebook computer include the application 101 and the permission synchronization function of the application 101 is enabled on the mobile phone, the tablet computer, and the notebook computer. A permission for the application 101 may be synchronized between the mobile phone, the tablet computer, and the notebook computer.

The network 11 between the electronic devices 10 may be a short-range wireless communication network. For example, the electronic devices 10 may perform short-distance wireless communication by using Bluetooth, Wi-Fi (Wireless Fidelity), NFC (Near Field Communication), a ZigBee technology, an IrDA (Infrared Data Association) technology, a UWB (ultra wideband) technology, or a wireless USB (Universal Serial Bus).

Figure 2:
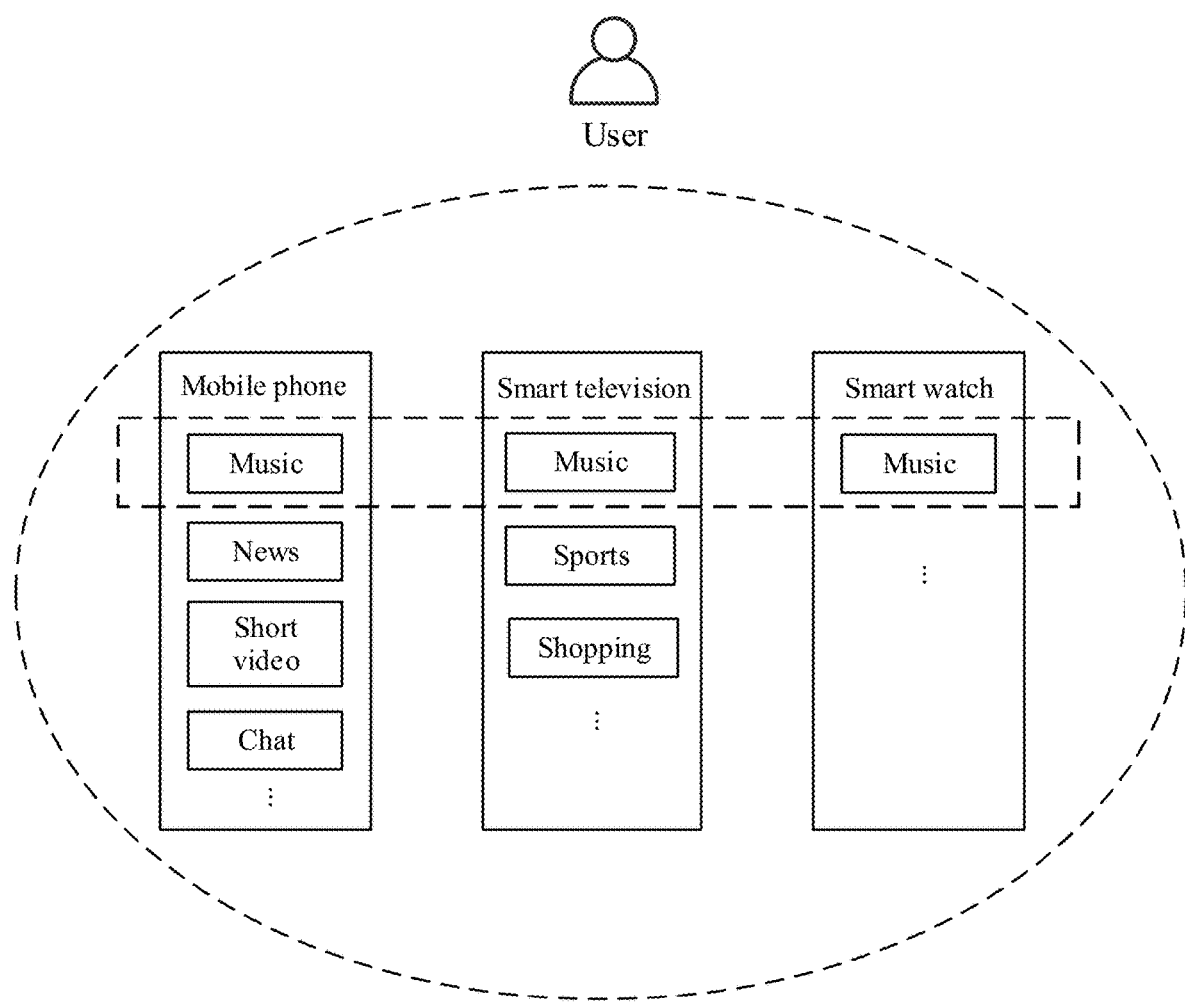
FIG. 2 is a schematic diagram in which an application permission synchronization method according to an embodiment of this application is applied to a plurality of electronic devices of a same user.

FIG. 2 is a schematic diagram in which an application permission synchronization method according to an embodiment of this application is applied to a plurality of electronic devices of a same user.

According to the application permission synchronization method provided in this embodiment of this application, application permission synchronization may be performed on a plurality of electronic devices of a same user. The plurality of electronic devices of the same user may use a same account. As shown in FIG. 2, a mobile phone, a smart television, and a smart watch of a same user form a network. The mobile phone, the smart television, and the smart watch include a music application. According to the application permission synchronization method provided in this embodiment of this application, permission synchronization for a same application (for example, the music application) may be performed on the mobile phone, the smart television, and the smart watch of the user.

Figure 3:
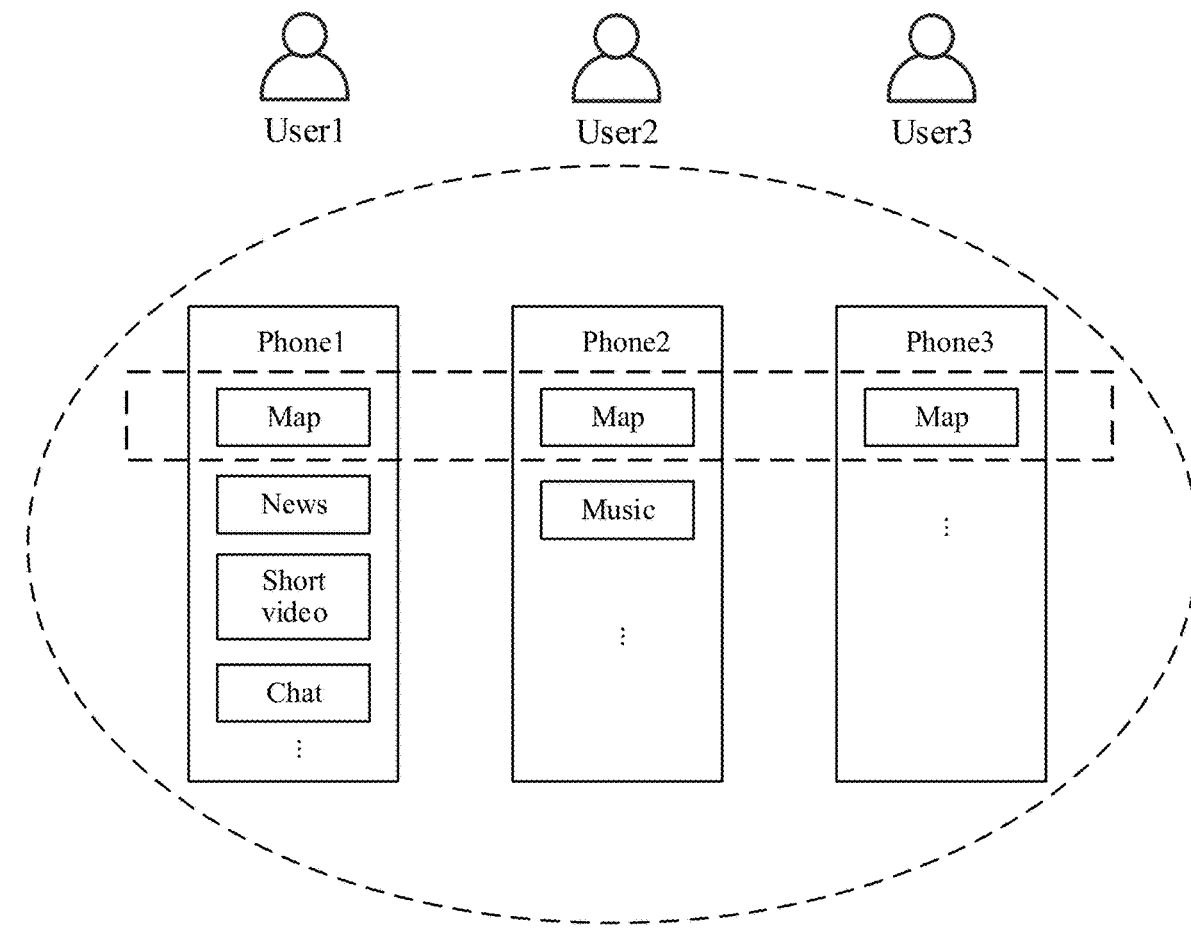
FIG. 3 is a schematic diagram in which an application permission synchronization method according to an embodiment of this application is applied to a plurality of electronic devices of different users.

FIG. 3 is a schematic diagram in which an application permission synchronization method according to an embodiment of this application is applied to a plurality of electronic devices of different users.

According to the application permission synchronization method provided in this embodiment of this application, permission synchronization for a same application may be performed on a plurality of electronic devices of different users (for example, electronic devices of different family members in a family or electronic devices of different employees in an office). The plurality of electronic devices of different users may use different accounts. As shown in FIG. 3, a mobile phone Phone1 of a user User1, a mobile phone Phone2 of User2, and a mobile phone Phone3 of User3 form a network. According to the application permission synchronization method provided in this embodiment of this application, permission synchronization for a same application (for example, a map application) may be performed on the mobile phone Phone1 of the User1, the mobile phone Phone2 of the User2, and the mobile phone Phone3 of the User3.

Figure 4:
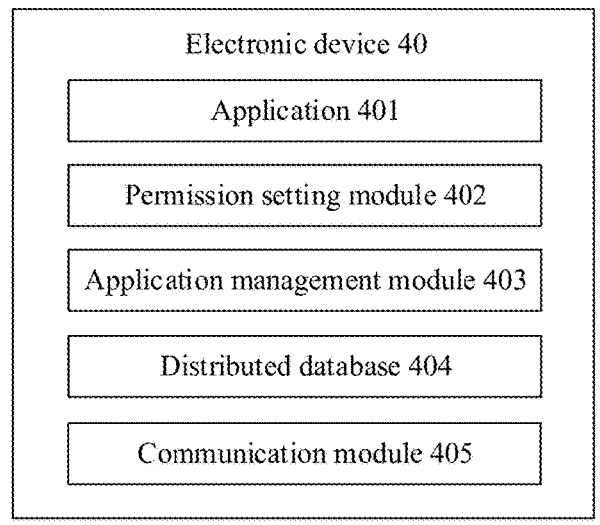
FIG. 4 is a diagram of a structure of a first electronic device and a second electronic device that implement an application permission synchronization method according to an embodiment of this application.
Figure 5A:
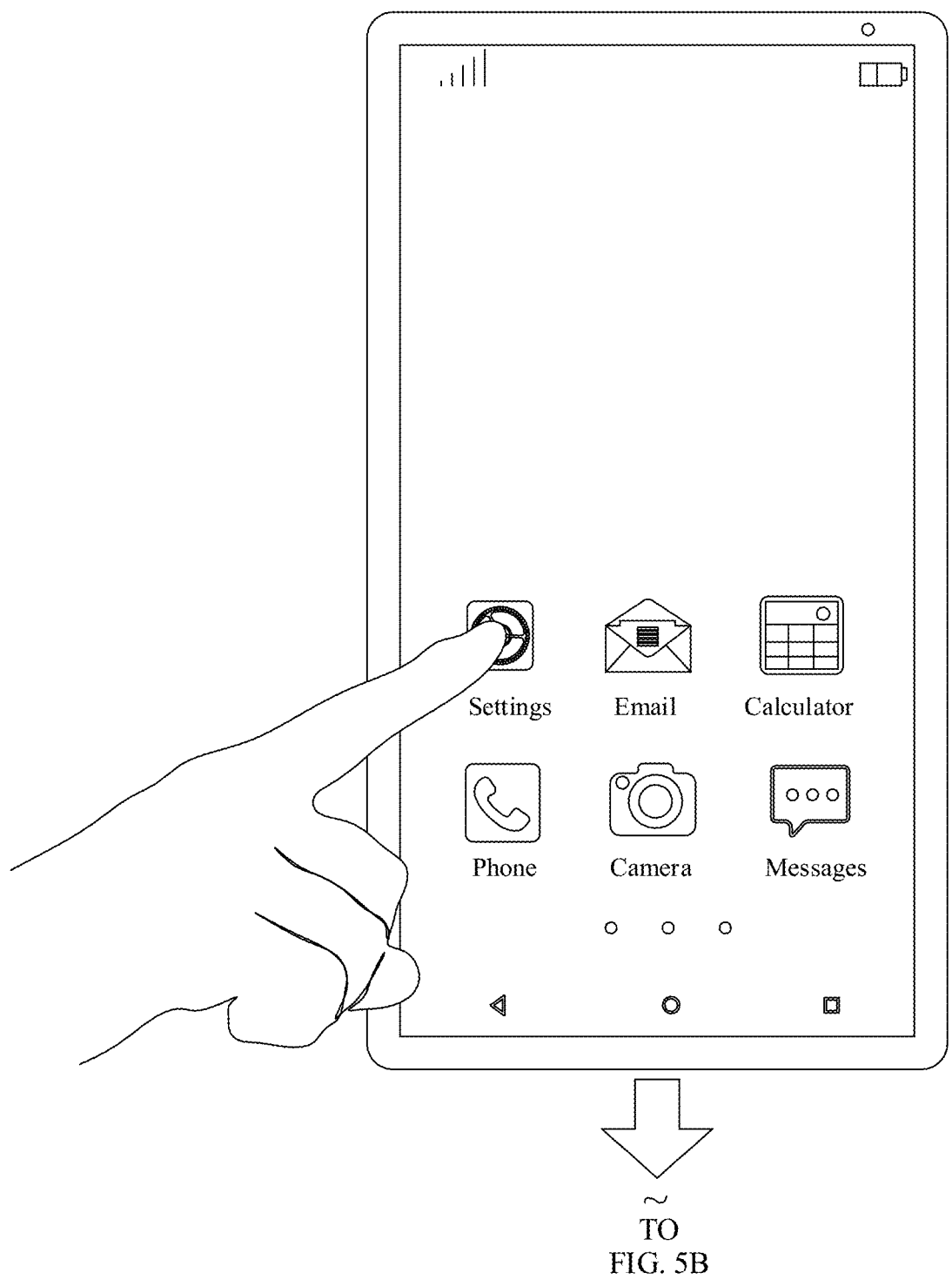
FIG. 5A to FIG. 5D are schematic diagrams in which a user enters an application permission setting interface.
Figure 5B:
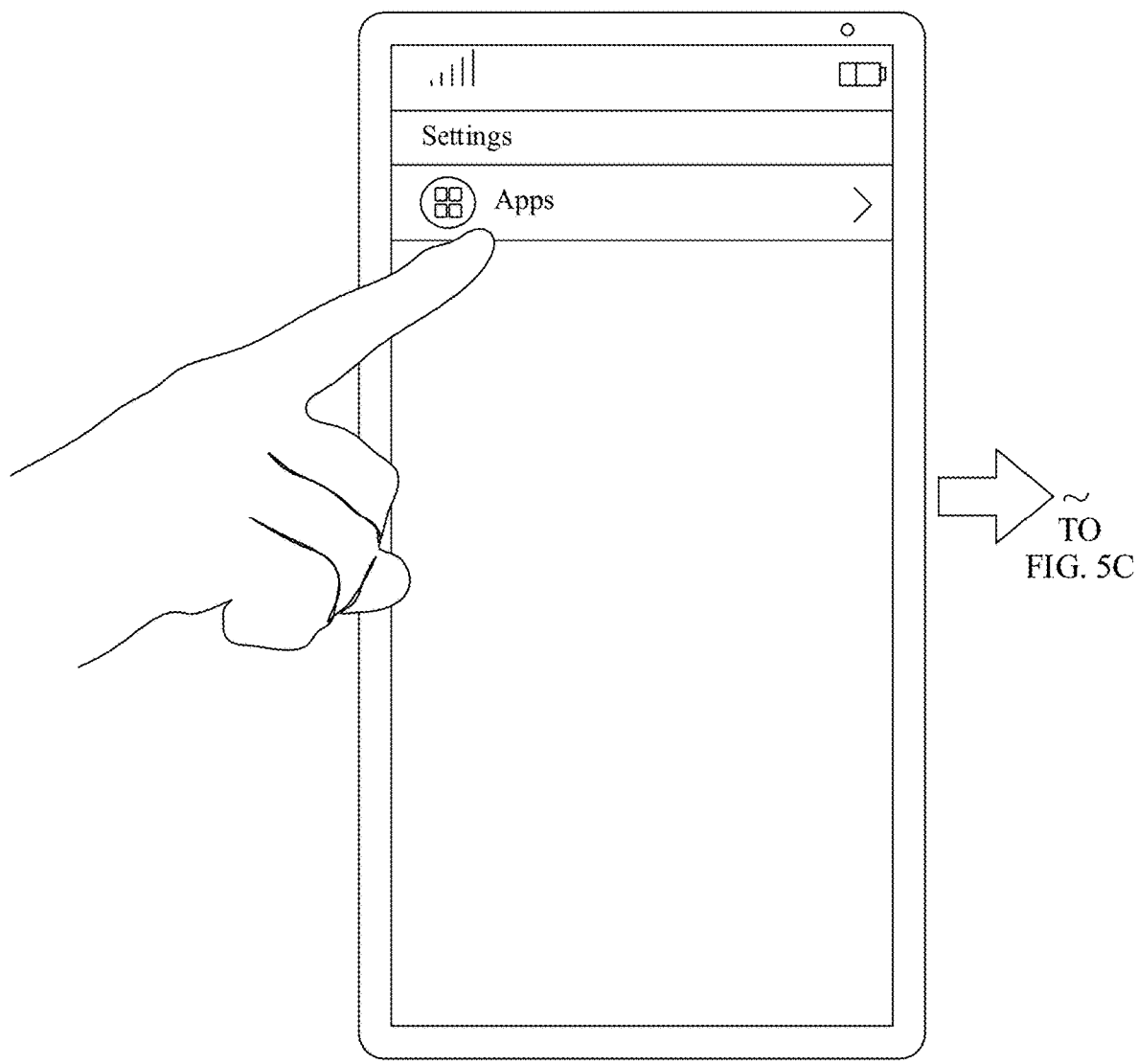
Figure 5C:
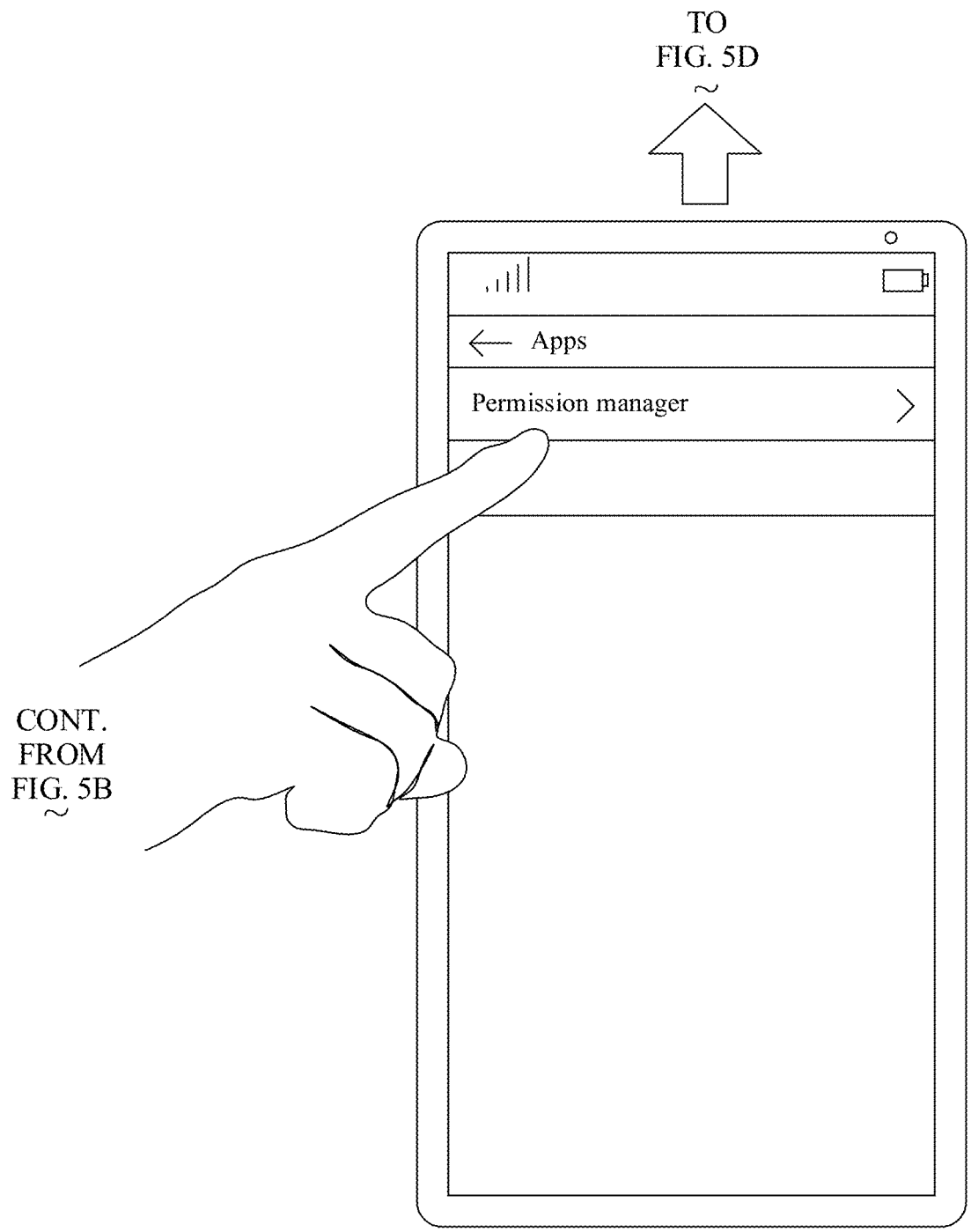
Figure 5D:
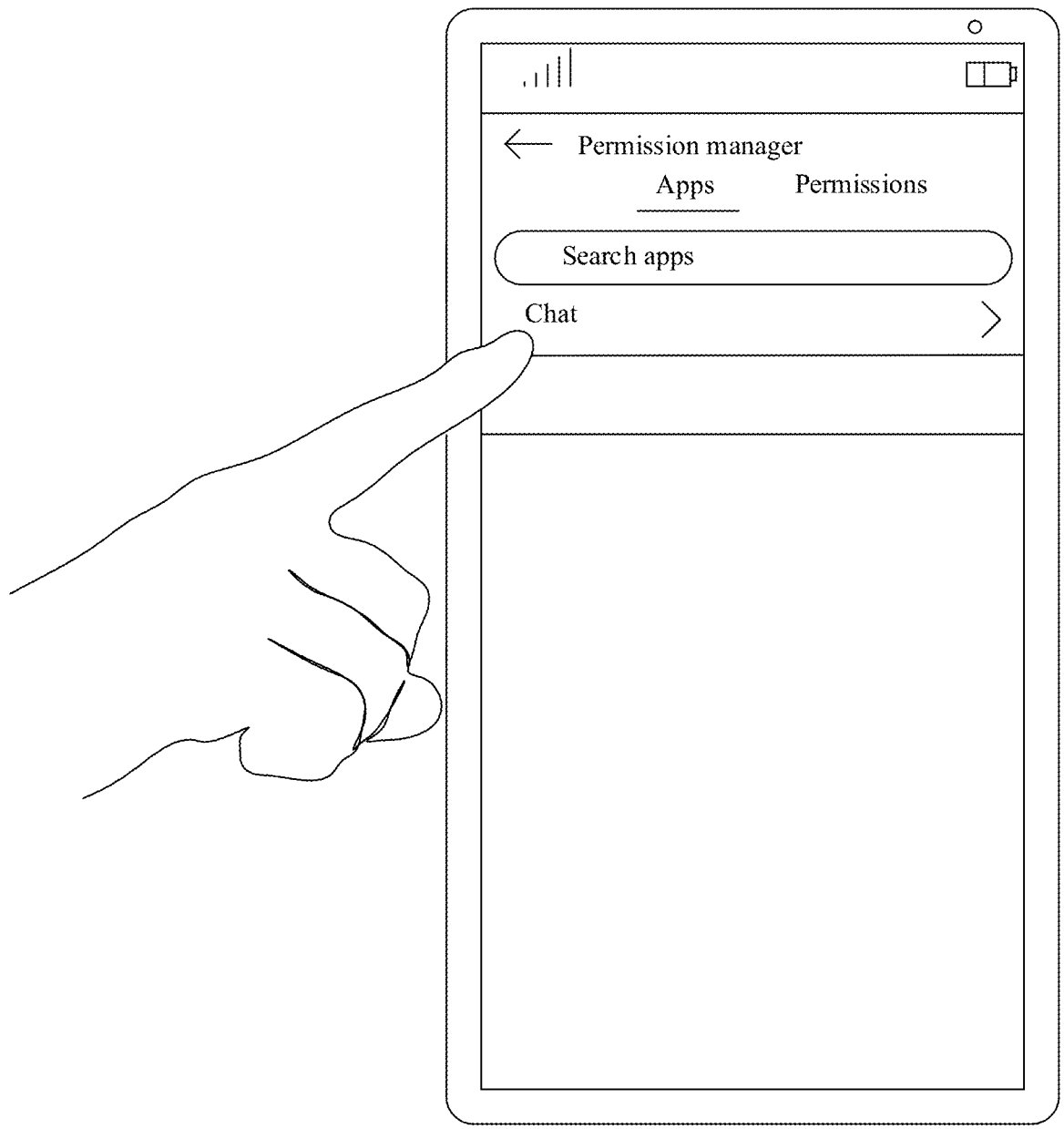

FIG. 4 is a diagram of a structure of an electronic device (for example, the mobile phone in FIG. 1 or FIG. 2) that implements an application permission synchronization method according to an embodiment of this application. An electronic device 40 may include an application 401, a permission setting module 402, an application management module 403, a distributed database 404, and a communication module 405.

The application 401 may be any application that can be run on the electronic device 40, for example, a music application, a chat application, a news application, or a map application. Each application 401 may have a unique package name used to distinguish between different applications.

The permission setting module 402 is configured to set a permission for the application 401 and a permission synchronization function of the application 401. The permission setting module 402 may display an application permission setting interface, so that a user sets the permission for the application 401 and the permission synchronization function of the application 401.

In an embodiment of this application, if a preset user operation is received, the electronic device 40 displays the application permission setting interface. FIG. 5A to FIG. 5D are a schematic diagram in which a user enters an application permission setting interface. The figures illustrate an example of entering an application permission setting interface of a chat application. As shown in FIG. 5A to FIG. 5D, a user may enter the application permission setting interface of the chat application by tapping "Settings">"Apps">"Permission manager">"Apps">"Permission manager">"Chat". It should be understood that the user may enter the application permission setting interface through another operation. For example, the user enters the application permission setting interface of the chat application by tapping "Settings">"Privacy">"Permission manager">"Apps">"Permission manager">"Chat".

Figure 6:
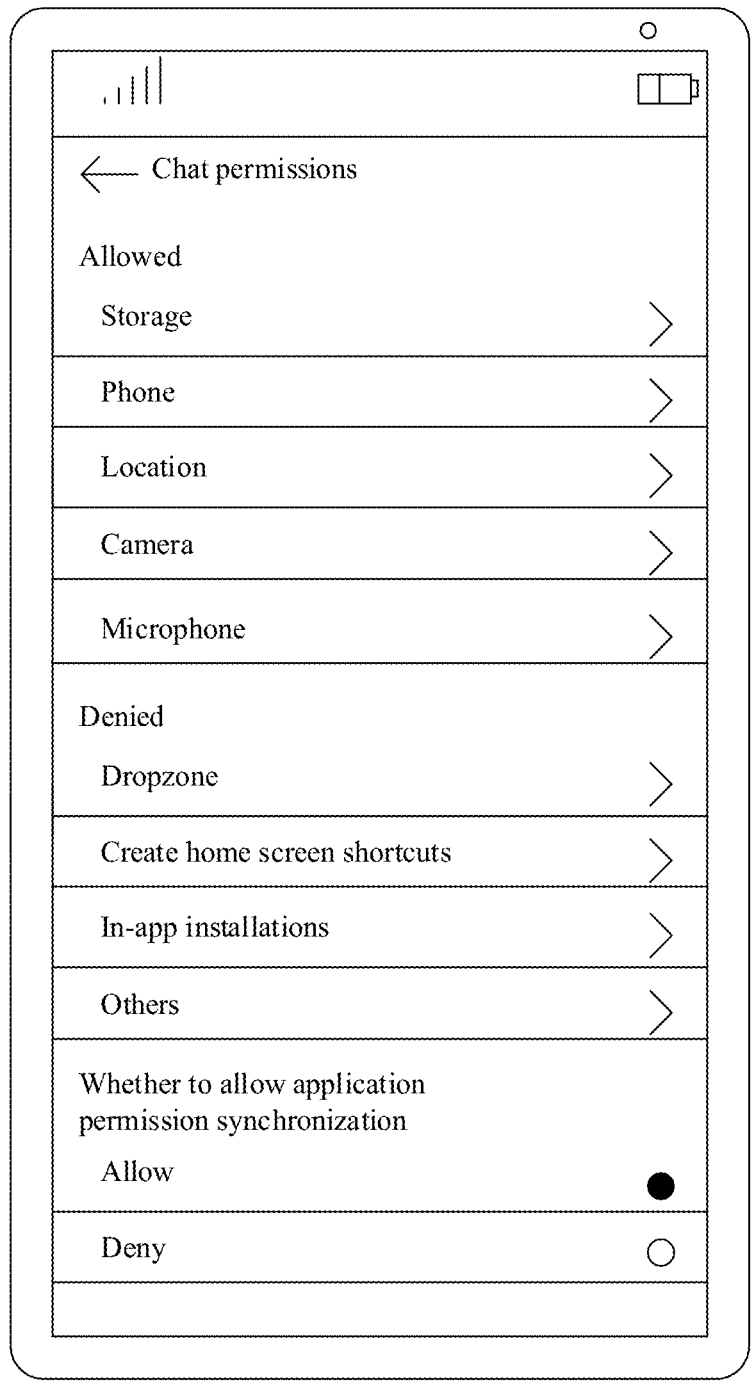
FIG. 6 is a schematic diagram of an application permission setting interface.

FIG. 6 is a schematic diagram of an application permission setting interface. The figure illustrates an example of an application permission setting interface of a chat application. As shown in FIG. 6, the application permission setting interface includes an allowed permission and a denied permission. A user may set the allowed permission for an application 401, or may set the denied permission. The application permission setting interface further includes two permission synchronization options: "Allow" and "Deny". If the permission synchronization option "Allow" is selected, a permission synchronization function of the application 401 is enabled. If the permission synchronization option "Deny" is selected, a permission synchronization function of the application 401 is disabled. Alternatively, the application permission setting interface may include a permission synchronization switch, to enable and disable the permission synchronization function of the application 401. The permission synchronization function of the application 401 may be in a disabled state by default.

An application management module 403 is configured to: manage permission granting information of an electronic device 40, and manage permission synchronization configuration information of the electronic device 40 and another electronic device communicatively connected to the electronic device 40. The permission granting information is used to describe a permission granted to an application (for example, the application 401) to invoke software and hardware functions of an electronic device (for example, the electronic device 40), that is, to describe a permission for the application on the electronic device. The permission synchronization configuration information is used to describe whether a permission synchronization function of each application (for example, the application 401) is enabled on an electronic device (for example, the electronic device 40). For example, as shown in FIG. 2, a network includes a mobile phone, a smart television, and a smart watch. Applications on the mobile phone include a music application, a news application, a short video application, and a chat application. Applications on the smart television include the music application, a sports application, and a shopping application. Applications on the smart watch include the music application. An application management module 403 in the mobile phone manages permission granting information (including permission granting information corresponding to the music application, the news application, the short video application, and the chat application) of the mobile phone, and manages permission synchronization configuration information of the mobile phone, the smart television, and the smart watch. An application management module 403 in the smart television manages permission granting information (including permission granting information corresponding to the music application, the sports application, and the shopping application) of the smart television, and manages the permission synchronization configuration information of the mobile phone, the smart television, and the smart watch. An application management module 403 in the smart watch manages permission granting information (including permission granting information corresponding to the music application) of the smart watch, and manages the permission synchronization configuration information of the mobile phone, smart television, and smart watch.

In an embodiment of this application, permission synchronization configuration information of each electronic device in a network may be represented by one integer (for example, a 32-bit integer), and each bit of the integer corresponds to one application. If one bit in the integer is 1, it indicates that a permission synchronization function of a corresponding application on the electronic device is enabled. If one bit in the integer is 0, it indicates that a permission synchronization function of a corresponding application on the electronic device is disabled. FIG. 2 is used as an example. A network includes a mobile phone, a smart television, and a smart watch. Applications on the mobile phone include a music application, a news application, a short video application, and a chat application. Applications on the smart television include the music application, a sports application, and a shopping application. Applications on the smart watch include the music application. An integer Int1 may be used to represent permission synchronization configuration information of the mobile phone, an integer Int2 may be used to represent permission synchronization configuration information of the smart television, and an integer Int3 may be used to represent permission synchronization configuration information of the smart watch. A first bit of the integer corresponds to the music application, a second bit of the integer corresponds to the news application, a third bit of the integer corresponds to the short video application, a fourth bit of the integer corresponds to the chat application, a fifth bit of the integer corresponds to the sports application, and a sixth bit of the integer corresponds to the shopping application. If a first bit of the integer Int1 is 1, it indicates that a permission synchronization function of the music application on the mobile phone is enabled. If a first bit of the integer Int1 is 0, it indicates that a permission synchronization function of the music application on the mobile phone is disabled. If a first bit of the integer Int2 is 1, it indicates that a permission synchronization function of the music application on the smart television is enabled. If a first bit of the integer Int2 is 0, it indicates that a permission synchronization function of the music application on the smart television is disabled. If a first bit of the integer Int3 is 1, it indicates that a permission synchronization function of the music application on the smart watch is enabled. If a first bit of the integer Int3 is 0, it indicates that a permission synchronization function of the music application on the smart watch is disabled. If a second bit of the integer Int1 is 1, it indicates that a permission synchronization function of the news application on the mobile phone is enabled. If a second bit of the integer Int1 is 0, it indicates that a permission synchronization function of the news application on the mobile phone is disabled. If a third bit of the integer Int1 is 1, it indicates that a permission synchronization function of the short video application on the mobile phone is enabled. If a third bit of the integer Int1 is 0, it indicates that a permission synchronization function of the short video application on the mobile phone is disabled. If a fourth bit of the integer Int1 is 1, it indicates that a permission synchronization function of the chat application on the mobile phone is enabled. If a fourth bit of the integer Int1 is 0, it indicates that a permission synchronization function of the chat application on the mobile phone is disabled. If a fifth bit of the integer Int2 is 1, it indicates that a permission synchronization function of the sports application on the smart television is enabled. If a fifth bit of the integer Int2 is 0, it indicates that a permission synchronization function of the sports application on the smart television is disabled. If a sixth bit of the integer Int2 is 1, it indicates that a permission synchronization function of the shopping application on the smart television is enabled. If a sixth bit of the integer Int2 is 0, it indicates that a permission synchronization function of the shopping application on the smart television is disabled.

If an electronic device (for example, the electronic device 40) does not include a particular application, one bit, corresponding to the application, in an integer representing permission synchronization configuration information of the electronic device may be empty.

A distributed database 404 is configured to: store permission granting information of the electronic device 40, and store permission synchronization configuration information of the electronic device 40 and another electronic device communicatively connected to the electronic device 40.

In an embodiment of this application, the distributed database 404 may further store security level information of each electronic device in the network. Security levels of electronic devices in the network may be the same or may be different. The electronic device 40 may perform application permission synchronization based on the security level information of each electronic device. For a process of performing application permission synchronization based on the security level information of each electronic device, refer to related descriptions of a flowchart.

The distributed database 404 may include a primary index and a secondary index that are used to search the distributed database 404 for permission synchronization configuration information of different electronic devices. The primary index may be a package name of the application 401, and the secondary index may be a device ID of a device on which the application 401 is installed. Same applications on different electronic devices may be distinguished based on package names and device IDs.

A communication module 405 is configured to perform data transmission between the electronic device 40 and another electronic device in the network. The communication module 405 may implement data transmission between the electronic device 40 and the another electronic device based on technologies such as Bluetooth, Wi-Fi, NFC, and ZigBee.

Figure 7:
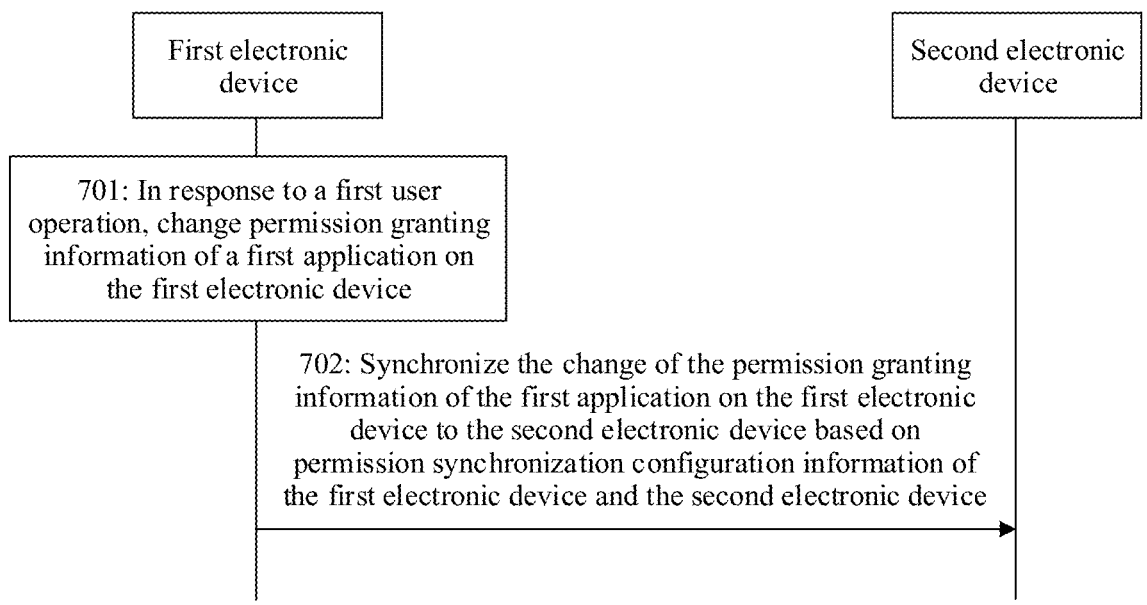
FIG. 7 is a processing flowchart when a permission for a first application on a first electronic device is modified according to an application permission synchronization method according to an embodiment of this application.

FIG. 7 is a processing flowchart when a permission for a first application on a first electronic device is modified according to an application permission synchronization method according to an embodiment of this application. A first electronic device is communicatively connected to a second electronic device, and the first electronic device and the second electronic device each include a first application.

701: In response to a first user operation, the first electronic device changes permission granting information of the first application on the first electronic device.

The first user operation is an operation of modifying a permission for the first application on the first electronic device. A user may open an application permission setting interface of the first application (for example, a music application) on the first electronic device, and modify the permission for the first application in the application permission setting interface of the first application.

For example, as shown in FIG. 2, the first electronic device is a mobile phone, the second electronic device is a smart watch, and the first application is the music application. The user performs the first user operation to modify a permission for the music application on the mobile phone, for example, modify a storage permission for the music application on the mobile phone from being allowed to being denied. In response to the first user operation, the first electronic device changes permission granting information of the first application on the first electronic device, for example, changes permission granting information of the music application on the first electronic device.

702: The first electronic device synchronizes the change of the permission granting information of the first application on the first electronic device to the second electronic device based on permission synchronization configuration information of the first electronic device and the second electronic device.

In one embodiment, the first electronic device determines, based on the permission synchronization configuration information of the first electronic device and the second electronic device, whether an application permission synchronization function of the first application is already enabled on the first electronic device and the second electronic device. If the application permission synchronization function of the first application is already enabled on the first electronic device and the second electronic device, the change of the permission granting information of the first application on the first electronic device is synchronized to the second electronic device. If the application permission synchronization function of the first application is not enabled on the first electronic device or the second electronic device, the procedure ends.

FIG. 2 continues to be used as an example. The mobile phone determines that an application permission synchronization function of the music application is already enabled on the mobile phone and the smart watch, and synchronizes the change of permission granting information of the music application on the mobile phone to the smart watch.

When the change of the permission granting information of the first application on the first electronic device is synchronized to the second electronic device, the first electronic device sends changed permission granting information of the first application on the first electronic device to the second electronic device, and the second electronic device modifies permission granting information of the first application on the second electronic device to be consistent with the changed permission granting information of the first application on the first electronic device, so that a permission for the first application on the second electronic device is consistent with a permission for the first application on the first electronic device.

According to the embodiment shown in FIG. 7, if a permission synchronization function of an application is already enabled on the first electronic device and the second electronic device, after the user modifies a permission for the application on the first electronic device, a permission change is automatically synchronized to the second electronic device, and the user does not need to perform a change operation on the second electronic device, so that efficiency of application permission synchronization is improved.

In another embodiment of this application, before synchronizing the change of the permission granting information of the first application on the first electronic device to the second electronic device (702), the first electronic device determines whether a security level of the first electronic device is higher than a security level of the second electronic device, and synchronizes the change of the permission granting information of the first application on the first electronic device to the second electronic device if the security level of the first electronic device is higher than the security level of the second electronic device. If the security level of the first electronic device is not higher than the security level of the second electronic device, the procedure ends. The first electronic device may determine whether the security level of the first electronic device is higher than the security level of the second electronic device based on locally stored security level information of the first electronic device and the second electronic device.

Figure 8:
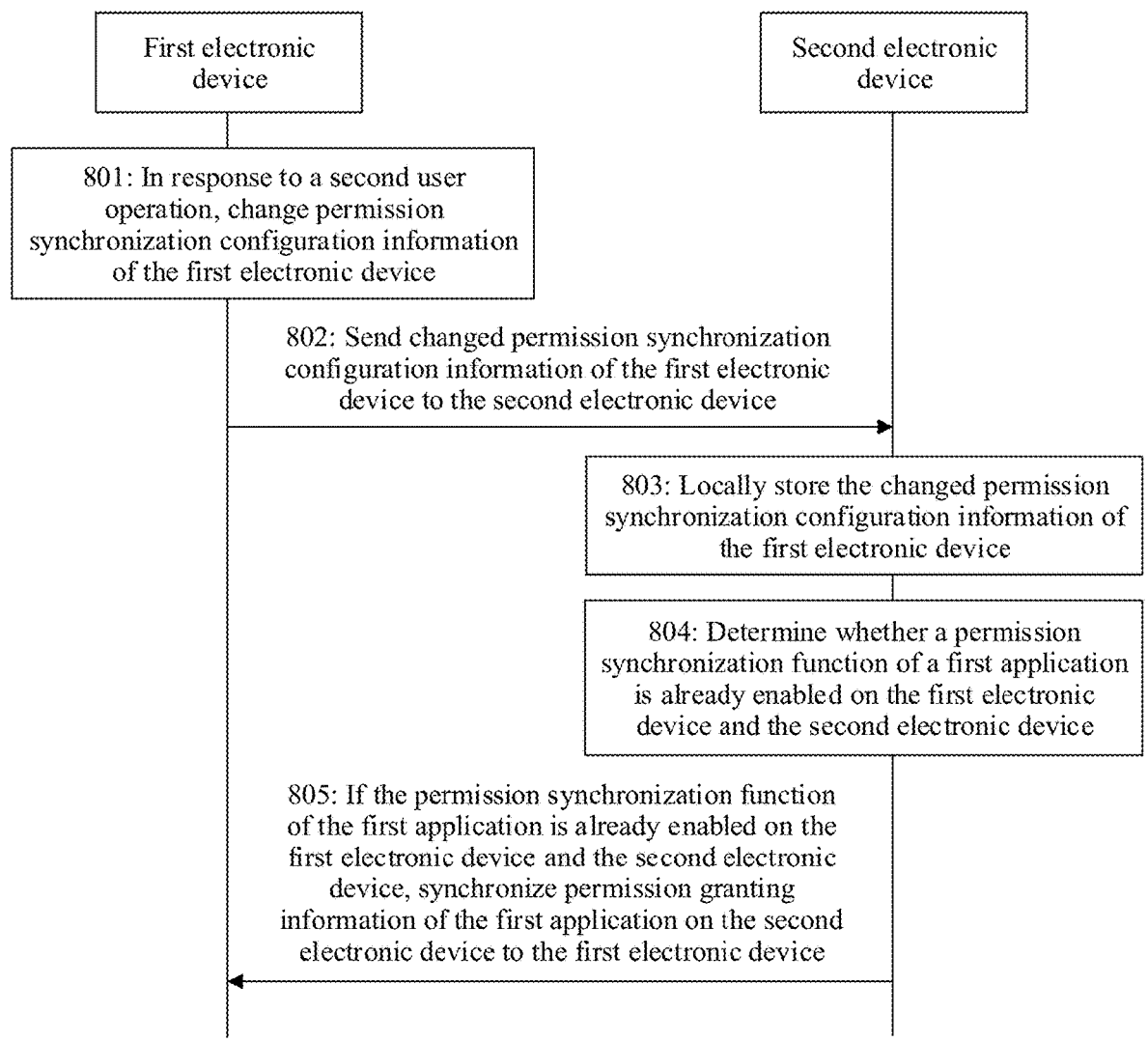
FIG. 8 is a processing flowchart when a permission synchronization function of a first application on a first electronic device is enabled or disabled according to an application permission synchronization method according to an embodiment of this application.

FIG. 8 is a processing flowchart when a permission synchronization function of a first application on a first electronic device is enabled or disabled according to an application permission synchronization method according to an embodiment of this application. A first electronic device is communicatively connected to a second electronic device. The first electronic device and the second electronic device each include a first application.

801: In response to a second user operation, the first electronic device changes permission synchronization configuration information of the first electronic device.

The second user operation is an operation of enabling or disabling a permission synchronization function of the first application on the first electronic device by the user. The user may open an application permission setting interface of the first application (for example, a music application) on the first electronic device, and enable or disable the permission synchronization function of the first application in the application permission setting interface of the first application.

Before the permission synchronization function of the first application on the first electronic device is enabled, the permission synchronization function of the first application on the first electronic device is disabled. Before the permission synchronization function of the first application on the first electronic device is disabled, the permission synchronization function of the first application on the first electronic device is enabled.

For example, refer to FIG. 2. The first electronic device is a mobile phone, the second electronic device is a smart watch, and the first application is the music application. The user performs the second user operation to enable or disable a permission synchronization function of the music application on the mobile phone. In response to the second user operation, the mobile phone changes permission synchronization configuration information of the mobile phone (that is, changes permission synchronization configuration information corresponding to the music application).

The permission synchronization configuration information of the first electronic device may be represented by one integer, and each application corresponds to one bit of the integer. For example, permission synchronization configuration information of the mobile phone is represented by one integer. If the permission synchronization function of the music application on the mobile phone is disabled, one bit, corresponding to the music application, in the integer is changed from 1 to 0. If the permission synchronization function of the music application on the mobile phone is enabled, one bit, corresponding to the music application, in the integer is changed from 0 to 1.

802: The first electronic device sends changed permission synchronization configuration information of the first electronic device to the second electronic device.

FIG. 2 continues to be used as an example. The mobile phone sends changed permission synchronization configuration information of the mobile phone to the smart watch.

803: The second electronic device locally stores the changed permission synchronization configuration information of the first electronic device.

FIG. 2 continues to be used as an example. The smart watch locally stores the changed permission synchronization configuration information of the mobile phone.

804: The second electronic device determines, based on the changed permission synchronization configuration information of the first electronic device and permission synchronization configuration information of the second electronic device, whether the permission synchronization function of the first application is already enabled on the first electronic device and the second electronic device.

FIG. 2 continues to be used as an example. The smart watch determines, based on the permission synchronization configuration information of the mobile phone and the smart watch, whether the permission synchronization function of the music application is already enabled on the mobile phone and the smart watch.

805: If the permission synchronization function of the first application is already enabled on the first electronic device and the second electronic device, the second electronic device synchronizes permission granting information of the first application on the second electronic device to the first electronic device.

In one embodiment, the second electronic device sends the permission granting information of the first application on the second electronic device to the first electronic device, and the first electronic device modifies permission granting information of the first application on the first electronic device to be consistent with the permission granting information of the first application on the second electronic device.

FIG. 2 continues to be used as an example. If the permission synchronization function of the music application is already enabled on the mobile phone and the smart watch, the smart watch synchronizes permission granting information of the music application on the smart watch to the mobile phone.

If the permission synchronization function of the first application is not enabled on the first electronic device or the second electronic device, the procedure ends.

According to the embodiment shown in FIG. 8, after the permission synchronization function of the application on the first electronic device is enabled or disabled, related processing may be performed to implement application permission synchronization, so that efficiency of application permission synchronization is improved.

In another embodiment of this application, if the permission synchronization function of the first application is already enabled on the first electronic device and the second electronic device, the second electronic device determines whether the security level of the second electronic device is higher than the security level of the first electronic device. If the security level of the second electronic device is higher than the security level of the first electronic device, the permission granting information of the first application on the second electronic device is synchronized to the first electronic device. If the security level of the second electronic device is not higher than the security level of the first electronic device, the procedure ends. The first electronic device and the second electronic device may determine whether the security level of the second electronic device is higher than the security level of the first electronic device based on locally stored security level information of the first electronic device and the second electronic device.

In another embodiment of this application, if the permission synchronization function of the first application is already enabled on a plurality of second electronic devices in the network and security levels of the plurality of second electronic devices are higher than the security level of the first electronic device, after receiving permission granting information of the first application on the plurality of second electronic devices, the first electronic device may select a second electronic device with a highest security level from the plurality of second electronic devices on which the permission synchronization function of the first application is already enabled, and modify the permission granting information of the first application on the first electronic device based on permission granting information of the first application on a selected second electronic device. In other words, if the permission synchronization function of the first application is already enabled on the plurality of second electronic devices, and the security levels of the plurality of second electronic devices are higher than the security level of the first electronic device, the permission granting information of the first application on the first electronic device may be modified to be consistent with the second electronic device with the highest security level in the plurality of second electronic devices.

Figure 9A:
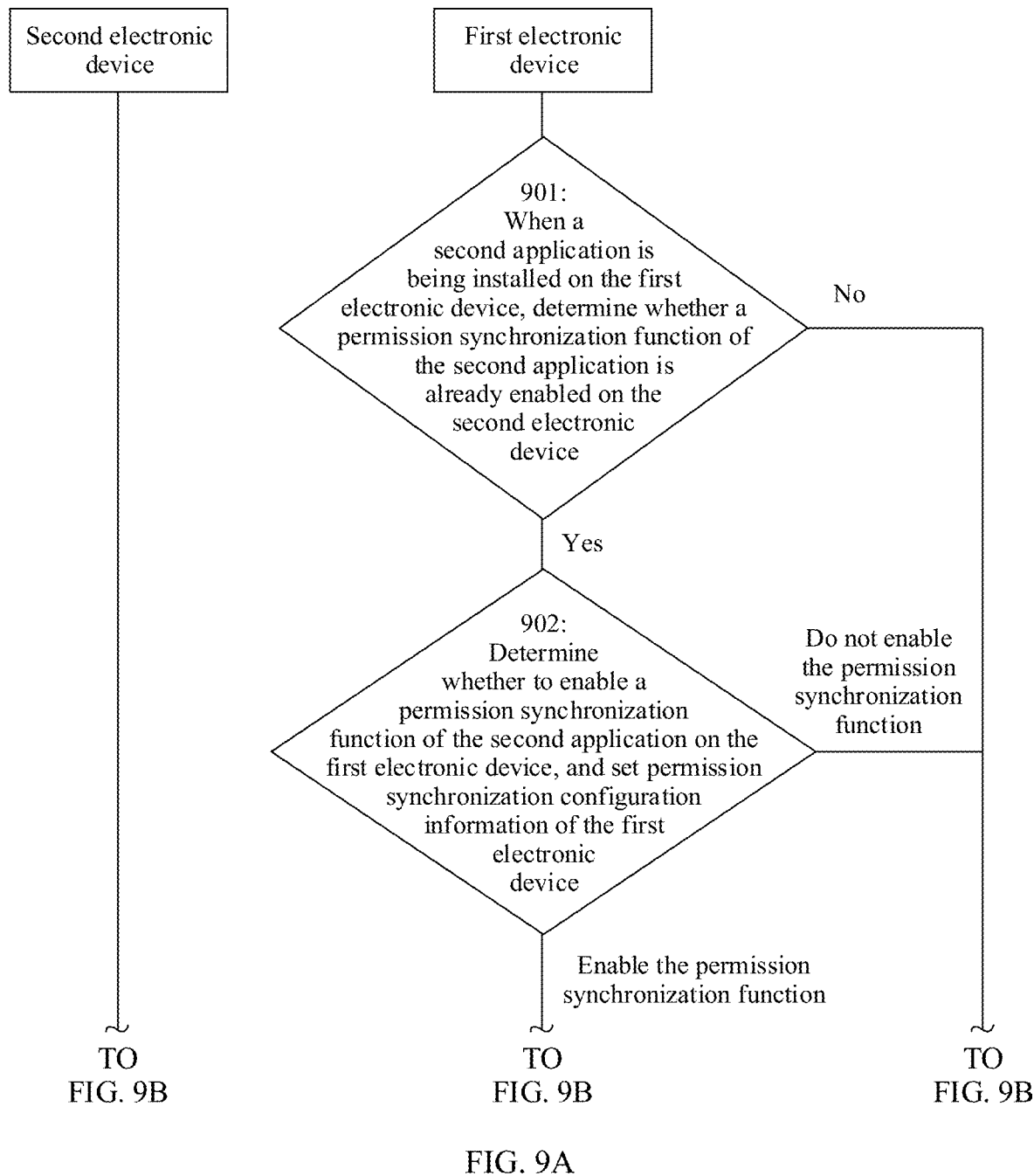
FIG. 9A and FIG. 9B are processing flowcharts when a second application is being installed on a first electronic device according to an application permission synchronization method according to an embodiment of this application.
Figure 9B:
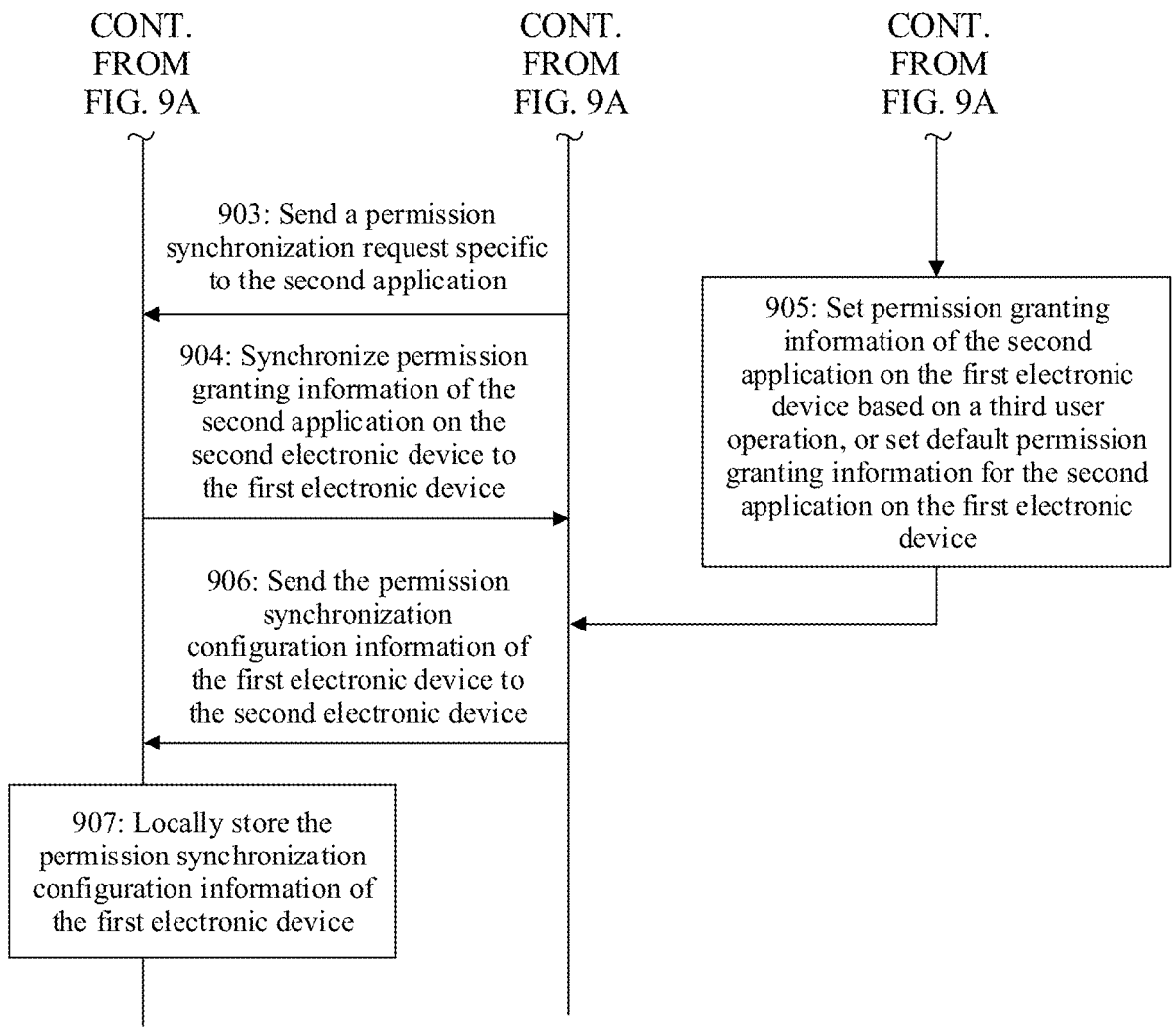

FIG. 9A and FIG. 9B are a processing flowchart when a new application (that is, a second application) is being installed on a first electronic device according to an application permission synchronization method according to an embodiment of this application. A first electronic device is communicatively connected to a plurality of second electronic devices.

901: When a second application is being installed on the first electronic device, the first electronic device determines, based on permission synchronization configuration information of the second electronic device, whether a permission synchronization function of the second application is already enabled on the second electronic device.

For example, refer to FIG. 1. A network includes a mobile phone, a tablet computer, a notebook computer, and a smart television. The first electronic device is the mobile phone, and the second electronic devices include the tablet computer, the notebook computer, and the smart television. When the second application (for example, a chat application) is being installed on the mobile phone, the mobile phone determines whether the permission synchronization function of the second application is already enabled on the tablet computer, the notebook computer, and the smart television.

In this embodiment, the first electronic device may locally store the permission synchronization configuration information of the second electronic device. In another embodiment, the first electronic device may send a request for querying permission synchronization configuration information to the second electronic device, to obtain the permission synchronization configuration information of the second electronic device.

If the permission synchronization function of the second application is not enabled on the second electronic device, 905 is performed.

902: If the permission synchronization function of the second application is already enabled on the second electronic device, the first electronic device prompts a user to confirm whether to enable a permission synchronization function of the second application on the first electronic device, and sets permission synchronization configuration information of the first electronic device based on confirmation of the user (that is, sets permission synchronization configuration information corresponding to the second application).

If the permission synchronization function of the second application is already enabled on the second electronic device, the first electronic device may send first prompt information, to prompt a user to confirm whether to enable the permission synchronization function of the second application on the first electronic device.

Figure 10:
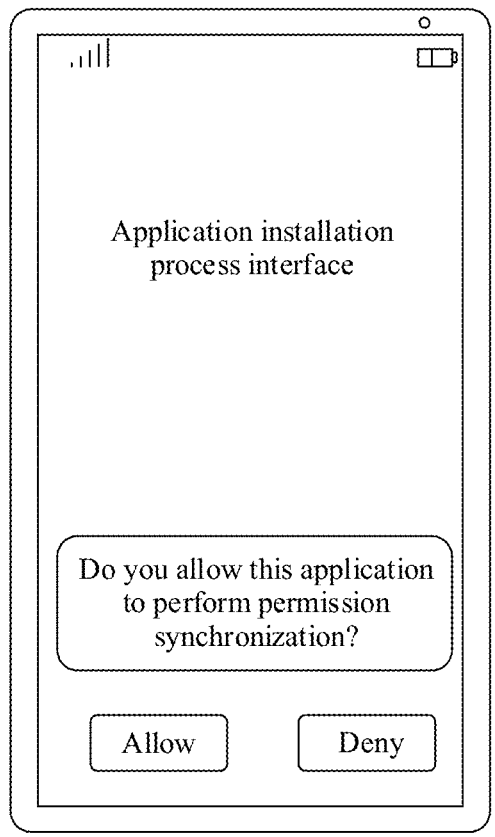
FIG. 10 is a schematic diagram in which a first electronic device sends first prompt information when a second application is being installed on the first electronic device and a permission synchronization function of the application is already enabled on a second electronic device.

FIG. 10 is a schematic diagram in which a first electronic device sends first prompt information when a new application (that is, a second application) is being installed on the first electronic device and a permission synchronization function of the second application is already enabled on a second electronic device. Refer to FIG. 10. When a new application is being installed on a first electronic device, if a permission synchronization function of a second application is already enabled on a second electronic device, the first electronic device may display a first prompt interface. The first prompt interface may include prompt information "Do you allow this application to perform permission synchronization?" and may further include two options: "Allow" and "Deny". If the user taps "Allow", the permission synchronization function of the second application is enabled on the first electronic device. If the user taps "Deny", the permission synchronization function of the second application is disabled on the first electronic device. Alternatively, the first prompt interface may include an option "Yes". If the user taps "Yes", the permission synchronization function of the second application is enabled on the first electronic device. If the user does not tap "Yes", the permission synchronization function of the second application is disabled on the first electronic device.

If the permission synchronization function of the second application is not enabled on the first electronic device, 905 is performed.

903: If the permission synchronization function of the second application is enabled on the first electronic device, the first electronic device sends a permission synchronization request to the second application to the second electronic device (that is, the second electronic device on which the permission synchronization function of the second application is already enabled).

904: In response to the permission synchronization request, the second electronic device synchronizes permission granting information of the second application on the second electronic device to the first electronic device.

In one embodiment, the second electronic device sends the permission granting information of the second application on the second electronic device to the first electronic device, and the first electronic device sets permission granting information of the second application on the first electronic device based on the permission granting information of the second application on the second electronic device, so that a permission for the second application on the first electronic device is consistent with permission for the second application on the second electronic device.

905: If the permission synchronization function of the second application is not enabled on the second electronic device when the second application is being installed on the first electronic device, or if the permission synchronization function of the second application is not enabled on the first electronic device, the first electronic device sets the permission granting information of the second application on the first electronic device based on a third user operation, or sets default permission granting information for the second application on the first electronic device.

The third user operation is an operation of setting the permission for the second application by the user. The user may open an application permission setting interface of the second application, and set the permission for the second application in the application permission setting interface of the second application.

906: The first electronic device sends the permission synchronization configuration information of the first electronic device to the second electronic device.

907: The second electronic device locally stores the permission synchronization configuration information of the first electronic device.

According to the embodiment shown in FIG. 9A and FIG. 9B, when the second application is being installed on the first electronic device, if the permission synchronization function of the second application is enabled, and the permission synchronization function of the second application is already enabled on the second electronic device, the permission granting information of the second application on the second electronic device is obtained, and the permission for the second application on the first electronic device is set based on the permission granting information of the second application on the second electronic device. The user does not need to perform an authorization operation on the second application, so that efficiency of configuring an application permission during application installation is improved.

In another embodiment of this application, before sending the permission synchronization request to the second application to the second electronic device, the first electronic device determines whether a security level of the second electronic device is higher than or equal to a security level of the first electronic device. If the security level of the second electronic device is higher than or equal to the security level of the first electronic device, the permission synchronization request specific to the second application is sent to the second electronic device. If the security level of the second electronic device is not higher than or equal to the security level of the first electronic device, 905 is performed.

In another embodiment of this application, if permission granting information that is of the second applications on the second electronic devices and that is returned by the plurality of second electronic devices is received, the first electronic device may select a second electronic device with a highest security level from the plurality of second electronic devices, and set the permission granting information of the second application on the first electronic device based on the permission granting information of the second application on the second electronic device.

Figure 11:
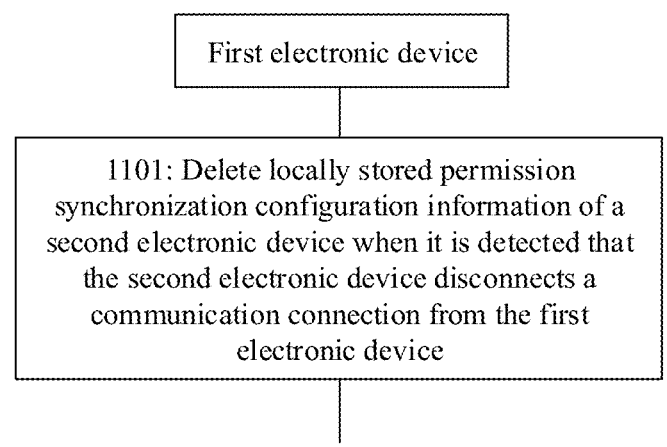
FIG. 11 is a processing flowchart when a second electronic device has a disconnection from a first electronic device according to an application permission synchronization method according to an embodiment of this application.

FIG. 11 is a processing flowchart when a second electronic device has a disconnection from a first electronic device according to an application permission synchronization method according to an embodiment of this application.

1101: A first electronic device deletes locally stored permission synchronization configuration information of a second electronic device when it is detected that the second electronic device disconnects a communication connection from the first electronic device (for example, leaves a network).

Figure 12:
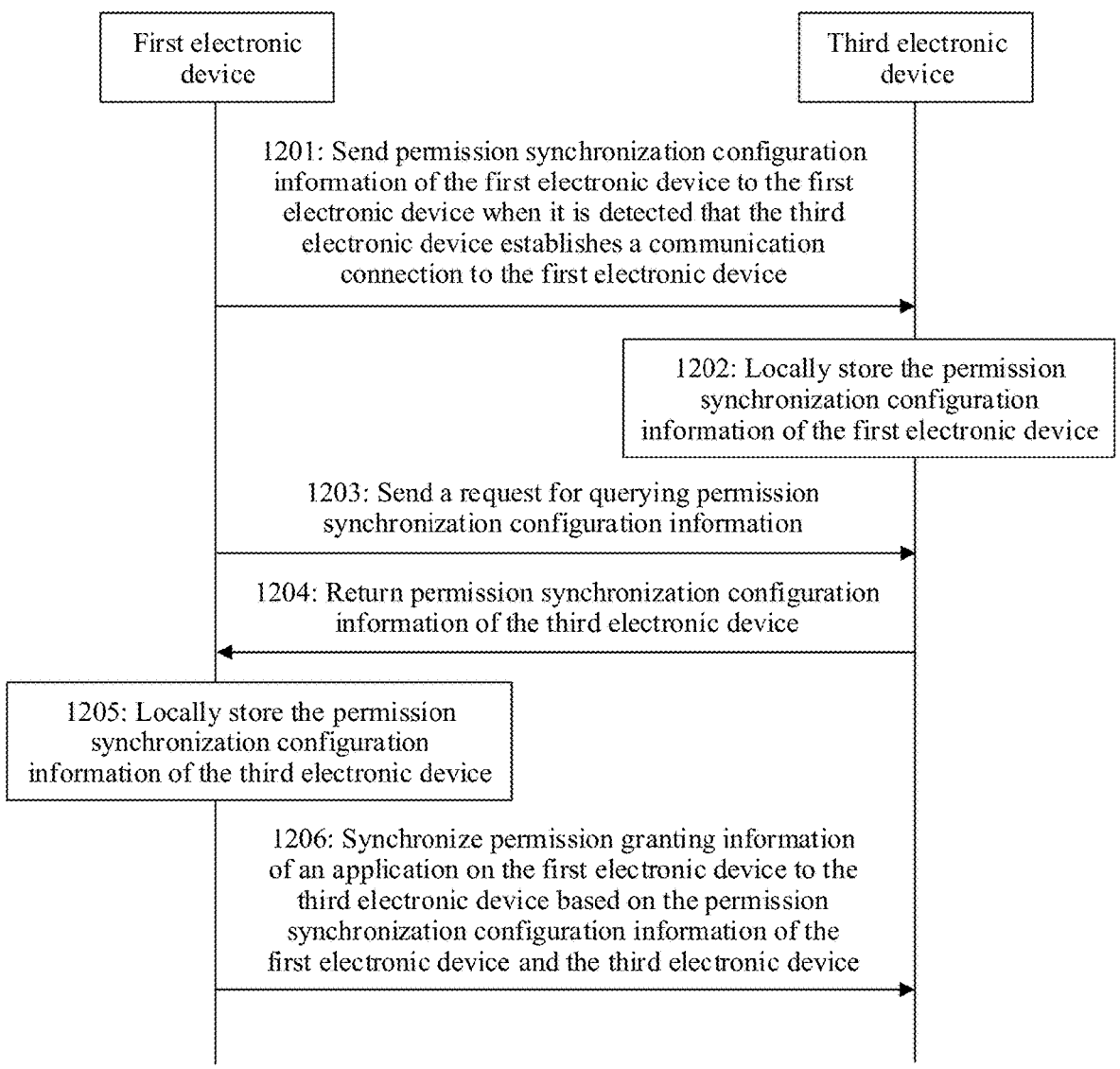
FIG. 12 is a processing flowchart when a third electronic device establishes a connection to a first electronic device according to an application permission synchronization method according to an embodiment of this application.

FIG. 12 is a processing flowchart when a third electronic device establishes a connection to a first electronic device according to an application permission synchronization method according to an embodiment of this application.

1201: A first electronic device sends permission synchronization configuration information of the first electronic device to the first electronic device when it is detected that a third electronic device establishes a communication connection to the first electronic device.

1202: The third electronic device locally stores the permission synchronization configuration information of the first electronic device.

1203: The first electronic device sends a request for querying permission synchronization configuration information to the third electronic device.

1204: In response to the request for querying permission synchronization configuration information, the third electronic device returns permission synchronization configuration information of the third electronic device to the first electronic device.

1205: The first electronic device may locally store the permission synchronization configuration information of the third electronic device.

1206: The first electronic device synchronizes permission granting information of an application (for example, a first application) on the first electronic device to the third electronic device based on the permission synchronization configuration information of the first electronic device and the third electronic device.

The first electronic device determines, based on the permission synchronization configuration information of the first electronic device and the third electronic device, whether a permission synchronization function of the application is enabled on the first electronic device and the third electronic device, and if the permission synchronization function of the application is enabled on the first electronic device and the third electronic device, the first electronic device synchronizes the permission granting information of the application on the first electronic device to the third electronic device.

In this embodiment of this application, before the permission granting information of the application on the first electronic device is synchronized to the third electronic device, the first electronic device may determine whether a security level of the first electronic device is higher than a security level of the third electronic device, and if the security level of the first electronic device is higher than the security level of the third electronic device, the first electronic device synchronizes the permission granting information of the application on the first electronic device to the third electronic device.

Figure 13:
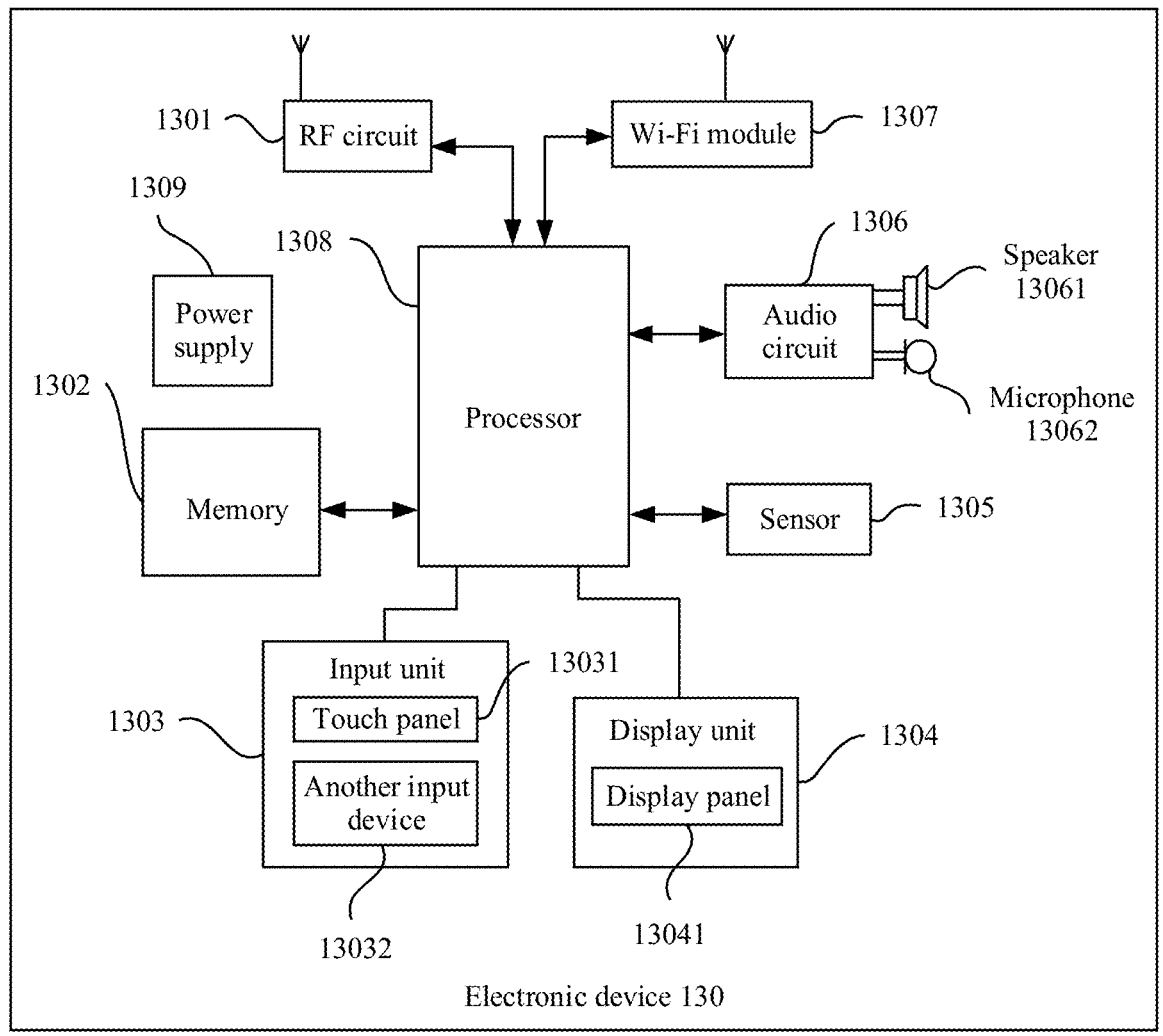
FIG. 13 is a schematic diagram of a structure of an electronic device according to an embodiment of this application.

FIG. 13 is a schematic diagram of a hardware structure of an electronic device according to an embodiment of this application. As shown in FIG. 11, an electronic device 110 may include components such as a radio frequency (RF) circuit 1101, a memory 1102, an input unit 1103, a display unit 1104, a sensor 1105, an audio circuit 1106, a Wi-Fi module 1107, a processor 1108, and a power supply 1109. A person skilled in the art may understand that the structure shown in FIG. 11 does not constitute a limitation on the electronic device 110, and the electronic device 110 may include more or fewer components than those shown in the figure, or combine some components, or have different component arrangements.

The RF circuit 1101 may be configured to receive and send signals during information receiving and sending or during a call. In particular, after receiving downlink information of a base station, the RF circuit 1101 sends the downlink information to the processor 1108 for processing, and further sends related uplink data to the base station. Generally, the RF circuit 1101 includes but is not limited to an antenna, at least one amplifier, a transceiver, a coupler, a low noise amplifier (LNA), a duplexer, and the like.

The memory 1102 may be configured to store a software program and a module. The processor 1108 performs various function applications on the electronic device and data processing by running the software program and the module that are stored in the memory 1102. The memory 1102 may mainly include a program storage area and a data storage area, where the program storage area may store an operating system, an application required for at least one function (such as a sound play function and an image play function), and the like. The data storage area may store data (such as audio data or a phone book) created based on use of the electronic device, and the like. In addition, the memory 1102 may include a high-speed random access memory, or may include a non-volatile memory, for example, at least one magnetic disk storage device, a flash memory device, or another volatile solid-state storage device.

The input unit 1103 may be configured to receive input digital or character information, and generate a button signal input related to user settings and function control of the electronic device. In one embodiment, the input unit 1103 may include a touch panel 11031 and another input device 11032. The touch panel 11031, also referred to as a touchscreen, may collect a touch operation of a user on or near the touch panel 11031 (for example, an operation of the user on or near the touch panel 11031 by using any suitable object or accessory, for example, a finger or a stylus), and drive a corresponding connection apparatus based on a preset program. In one embodiment, the touch panel 11031 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, sends the touch point coordinates to the processor 1108, and receives and executes a command sent by the processor 1108. In addition, the touch panel 11031 may be implemented in a plurality of types, such as a resistive type, a capacitive type, an infrared type, and a surface acoustic wave type. In addition to the touch panel 11031, the input unit 1103 may further include another input device 11032. In one embodiment, the another input device 11032 may include but be not limited to one or more of a physical keyboard, a functional button (such as a volume control button or an on/off button), a trackball, a mouse, and a joystick.

The display unit 1104 may be configured to display information input by the user, information provided for the user, and various menus of the electronic device. The display unit 1104 may include a display panel 11041. In one embodiment, the display panel 11041 may be configured in a form of liquid crystal display (LCD), an organic light-emitting diode (OLED), or the like. Further, the touch panel 11031 may cover the display panel 11041. After detecting a touch operation on or near the touch panel 11031, the touch panel 11031 transfers the touch operation to the processor 1108, to determine a type of a touch event. Subsequently, the processor 1108 provides a corresponding visual output in the display panel 11041 based on the type of the touch event. Although the touch panel 11031 and the display panel 11041 are used as two separate components to implement input and output functions of the electronic device in FIG. 11, in some embodiments, the touch panel 11031 and the display panel 11041 may be integrated to implement the input and output functions of the electronic device.

The electronic device may further include at least one type of sensor 1105, for example, a light sensor, a motion sensor, and another sensor. In one embodiment, the light sensor may include an ambient light sensor and a proximity sensor. The ambient light sensor may adjust luminance of the display panel 11041 based on intensity of ambient light. The proximity sensor may turn off the display panel 11041 and/or backlight when the electronic device moves close to an ear. As a type of motion sensor, an accelerometer sensor may detect magnitudes of acceleration in various directions (typically three axes), and detect a magnitude and a direction of gravity when the electronic device is stationary, and may be used for electronic device posture recognition applications (for example, landscape/portrait mode switching, a related game, and magnetometer posture calibration), vibration recognition-related functions (such as a pedometer or a stroke), and the like. For other sensors such as a gyroscope, a barometer, a hygrometer, a thermometer, and an infrared sensor that can also be configured in the electronic device, details are not described herein again.

The audio circuit 1106, a speaker 11061, and a microphone 11062 may provide an audio interface between the user and the electronic device. The audio circuit 1106 may transmit, to the speaker 11061, an electrical signal converted from received audio data, and the speaker 11061 converts the electrical signal to a sound signal for outputting. On the other hand, the microphone 11062 converts a collected sound signal into an electrical signal. The audio circuit 1106 receives the electrical signal, converts the electrical signal to audio data, and then outputs the audio data to the processor 1108 for processing. Then the audio data is sent to another electronic device through the RF circuit 1101, or is output to the memory 1102 for further processing.

Wi-Fi is a short-range wireless transmission technology. The electronic device may help, by using the Wi-Fi module 1107, the user receive and send an email, browse a web page, access streaming media, and the like. The Wi-Fi provides wireless broadband Internet access for the user. Although FIG. 11 shows the Wi-Fi module 1107, it may be understood that the Wi-Fi module 1107 is not a mandatory component of the electronic device, and may be omitted based on a requirement without changing the essence of this disclosure.

The processor 1108 is a control center of the electronic device, connects to various parts of the entire electronic device by using various interfaces and lines, and performs various functions of the electronic device and data processing by running or executing the software program and/or the module stored in the memory 1102 and invoking data stored in the memory 1102, to perform overall monitoring over the electronic device. In one embodiment, the processor 1108 may include one or more processing units. Preferably, an application processor and a modem processor may be integrated into the processor 1108. The application processor mainly processes an operating system, a user interface, an application, and the like. The modem processor mainly processes wireless communication. It may be understood that the modem processor may alternatively not be integrated into the processor 1108.

The electronic device further includes the power supply 1109 (for example, a battery) that supplies power to all components. In one embodiment, the power supply may be logically connected to the processor 1108 by using a power management system, to implement functions such as charging management, discharging management, power consumption management, and the like, by using the power management system.

Although not shown in the figure, the electronic device may further include a camera, a Bluetooth module, and the like, and details are not described herein.

The electronic device described in FIG. 11 may be configured to implement some or all procedures in embodiments of this application. For details, refer to related descriptions in the foregoing embodiments. Details are not described herein again.

This embodiment further provides a computer storage medium. The computer storage medium stores computer instructions. When the computer instructions are run on an electronic device, the electronic device is enabled to perform the foregoing related method operations to implement the application permission synchronization method in the foregoing embodiments.

This embodiment further provides a computer program product. When the computer program product is run on an electronic device, the electronic device is enabled to perform the foregoing related operations, to implement the application permission synchronization method in the foregoing embodiments.

In addition, an embodiment of this application further provides an apparatus. The apparatus may be a chip, a component, or a module. The apparatus may include a processor and a memory that are connected to each other. The memory is configured to store computer-executable instructions. When the apparatus is run, the processor may execute the computer-executable instructions stored in the memory, to enable the chip to perform the application permission synchronization method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

The foregoing description of the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the apparatus embodiments described above are merely examples. For example, division into the module or unit is merely a logical function division, and may be other division during an actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed to different places. Some or all of the units may be selected depending on actual requirements to achieve the objectives of the solutions in embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An application permission synchronization method, applied to a first electronic device, wherein the method comprises:

in response to a first user operation, changing permission granting information of a first application on the first electronic device, wherein the permission granting information describes a permission granted to the first application to invoke at least one of a software function or a hardware function of the first electronic device; and if a security level of the first electronic device is higher than a security level of a second electronic device, synchronizing the change of the permission granting information of the first application on the first electronic device to the second electronic device based on permission synchronization configuration information of the first application on the first electronic device and the second electronic device, wherein the permission synchronization configuration information describes whether a permission synchronization function of the first application is enabled.

2. The application permission synchronization method according to claim 1, wherein the method further comprises:
in response to a second user operation, changing the permission synchronization configuration information of the first electronic device; and
sending the changed permission synchronization configuration information of the first electronic device to the second electronic device.

3. The application permission synchronization method according to claim 2, wherein after the sending the changed permission synchronization configuration information of the first electronic device to the second electronic device, the method further comprises:
receiving, from the second electronic device, permission granting information of the first application in response to determining that the permission synchronization function of the first application is already enabled on the first electronic device and the second electronic device; and
if the security level of the second electronic device is higher than the security level of the first electronic device, synchronizing the permission granting information of the first application on the first electronic device based on the permission granting information of the first application on the second electronic device.

4. The application permission synchronization method according to claim 1, wherein the method further comprises:
receiving permission synchronization configuration information of the second electronic device; and
locally storing the permission synchronization configuration information of the second electronic device on the first electronic device.

5. The application permission synchronization method according to claim 1, wherein the method further comprises:
when a second application is being installed on the first electronic device, setting permission synchronization configuration information of the first electronic device for the second application;
if the security level of the second electronic device is higher than the security level of the first electronic device, and the permission synchronization function is already enabled on the first electronic device and the second electronic device, sending a permission synchronization request corresponding to the second application to the second electronic device;
receiving, from the second electronic device, permission granting information of the second application on the second electronic device; and
setting, on the first electronic device, permission granting information of the second application on the first electronic device based on the permission granting information of the second application on the second electronic device.

6. The application permission synchronization method according to claim 5, wherein the setting the permission synchronization configuration information of the first electronic device comprises:
if a permission synchronization function of the second application is already enabled on the second electronic device, prompting a user to confirm whether to enable the permission synchronization function of the second application on the first electronic device; and
setting the permission synchronization configuration information of the first electronic device based on receiving a confirmation from the user.

7. The application permission synchronization method according to claim 1, wherein the method further comprises:
deleting, on the first electronic device, locally stored permission synchronization configuration information of the second electronic device when it is detected that the second electronic device disconnects a communication connection from the first electronic device.

8. The application permission synchronization method according to claim 1, wherein the method further comprises:
sending a request for querying permission synchronization configuration information to a third electronic device when it is detected that the third electronic device establishes a communication connection to the first electronic device; and
receiving, from the third electronic device, permission synchronization configuration information of the third electronic device in response to the request for querying permission synchronization configuration information.

9. The application permission synchronization method according to claim 8, wherein the method further comprises:
if the security level of the first electronic device is higher than a security level of the third electronic device, synchronizing permission granting information of the first application on the first electronic device to the third electronic device based on the permission synchronization configuration information of the first electronic device and the third electronic device.

10. The application permission synchronization method according to claim 1, wherein the method further comprises:
if a preset user operation is received, displaying an application permission setting interface, wherein the application permission setting interface comprises at least one of a permission synchronization option or a permission synchronization switch.

11. A non-transitory computer-readable storage medium, having instructions stored thereon which, when executed by a processor on a first electronic device, cause the processor to:
in response to a first user operation, change permission granting information of a first application on the first electronic device, wherein the permission granting information describes a permission granted to the first application to invoke at least one of a software function or a hardware function of an electronic device; and
if a security level of the first electronic device is higher than a security level of a second electronic device, synchronize the change of the permission granting information of the first application on the first electronic device to the second electronic device based on permission synchronization configuration information of the first application on the first electronic device and the second electronic device, wherein the permission synchronization configuration information describes whether a permission synchronization function of the first application is enabled.

12. The non-transitory computer-readable storage medium according to claim 11, wherein the processor is to:
in response to a second user operation, change the permission synchronization configuration information of the first electronic device; and
send the changed permission synchronization configuration information of the first electronic device to the second electronic device.

13. The non-transitory computer-readable storage medium according to claim 12, wherein after the sending the changed permission synchronization configuration information of the first electronic device to the second electronic device, the processor is to:
receive, from the second electronic device, permission granting information of the first application in response to determining that the permission synchronization function of the first application is already enabled on the first electronic device and the second electronic device; and
if the security level of the second electronic device is higher than the security level of the first electronic device, synchronize the permission granting information of the first application on the first electronic device based on the permission granting information of the first application on the second electronic device.

14. The non-transitory computer-readable storage medium according to claim 11, wherein the processor is to:
receive permission synchronization configuration information of the second electronic device; and
store locally the permission synchronization configuration information of the second electronic device on the first electronic device.

15. The non-transitory computer-readable storage medium according to claim 11, wherein the processor is to:
when a second application is being installed on the first electronic device, set permission synchronization configuration information of the first electronic device for the second application;
if the security level of the second electronic device is higher than the security level of the first electronic device, and the permission synchronization function is already enabled on the first electronic device and the second electronic device, send a permission synchronization request corresponding to the second application to the second electronic device;
receive, from the second electronic device, permission granting information of the second application on the second electronic device; and
set, on the first electronic device, permission granting information of the second application on the first electronic device based on the permission granting information of the second application on the second electronic device.

16. A first electronic device, comprising:
a processor; and
a memory to store instructions that, when executed by the processor, cause the processor to:
in response to a first user operation, change permission granting information of a first application on the first electronic device, wherein the permission granting information describes a permission granted to the first application to invoke at least one of a software function or a hardware function of the first electronic device; and
if a security level of the first electronic device is higher than a security level of a second electronic device, synchronize the change of the permission granting information of the first application on the first electronic device to the second electronic device based on permission synchronization configuration information of the first application on the first electronic device and the second electronic device, wherein the permission synchronization configuration information describes whether a permission synchronization function of the first application is enabled.

17. The first electronic device according to claim 16, wherein the processor, responsive to executing the instructions, further cause the processor to:
in response to a second user operation, change the permission synchronization configuration information of the first electronic device; and
send the changed permission synchronization configuration information of the first electronic device to the second electronic device.

18. The first electronic device according to claim 17, wherein after the sending the changed permission synchronization configuration information of the first electronic device to the second electronic device, responsive to executing the instructions, further cause the processor to:
receive, from the second electronic device, permission granting information of the first application in response to determining that the permission synchronization function of the first application is already enabled on the first electronic device and the second electronic device; and
if the security level of the second electronic device is higher than the security level of the first electronic device, synchronize the permission granting information of the first application on the first electronic device based on the permission granting information of the first application on the second electronic device.

19. The first electronic device according to claim 16, wherein the processor, responsive to executing the instructions, further cause the processor to:
receive permission synchronization configuration information of the second electronic device; and
store locally the permission synchronization configuration information of the second electronic device on the first electronic device.

20. The first electronic device according to claim 16, wherein the processor, responsive to executing the instructions, further cause the processor to:
when a second application is being installed on the first electronic device, set permission synchronization configuration information of the first electronic device for the second application;
if the security level of the second electronic device is higher than the security level of the first electronic device, and the permission synchronization function is already enabled on the first electronic device and the second electronic device, send a permission synchronization request corresponding to the second application to the second electronic device;
receive, from the second electronic device, permission granting information of the second application on the second electronic device; and
set, on the first electronic device, permission granting information of the second application on the first electronic device based on the permission granting information of the second application on the second electronic device.

\* \* \* \* \*